US 8,633,797 B2

(12) United States Patent
Farris et al.

(10) Patent No.: US 8,633,797 B2
(45) Date of Patent: *Jan. 21, 2014

(54) ROLLING CODE SECURITY SYSTEM

(71) Applicant: The Chamberlain Group, Inc., Elmhurst, IL (US)

(72) Inventors: Bradford L. Farris, Chicago, IL (US); James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,476

(22) Filed: Sep. 26, 2012

(65) Prior Publication Data
US 2013/0021137 A1 Jan. 24, 2013

Related U.S. Application Data

(60) Continuation of application No. 12/177,366, filed on Jul. 22, 2008, now Pat. No. 8,284,021, which is a continuation of application No. 11/313,331, filed on Dec. 21, 2005, now Pat. No. 7,623,663, which is a continuation of application No. 10/884,051, filed on Jul. 2, 2004, now Pat. No. 7,492,898, which is a continuation of application No. 10/215,900, filed on Aug. 9, 2002, now Pat. No. 6,810,123, which is a continuation of application No. 09/981,433, filed on Oct. 17, 2001, now Pat. No. 6,980,655, which is a continuation of application No. 09/489,073, filed on Jan. 21, 2000, now Pat. No. 6,690,796, which is a division of application No. 08/873,149, filed on Jun. 11, 1997, now Pat. No. 6,154,544, which is a continuation of application No. 08/446,886, filed on May 17, 1995, now abandoned.

(51) Int. Cl.
G05B 23/00 (2006.01)

(52) U.S. Cl.
USPC .................................................. 340/5.26

(58) Field of Classification Search
USPC ....................................... 340/5.26, 5.7, 5.6
See application file for complete search history.

(56) References Cited

U.S. PATENT DOCUMENTS 2,405,500 A   8/1946  Guanella
3,716,865 A   2/1973  Willmott
(Continued)

FOREIGN PATENT DOCUMENTS

DE    3234538    3/1984
DE    3234539    3/1984
(Continued)

OTHER PUBLICATIONS

*Microchip v. The Chamberlain Group, Inc.*, (TCG019874-019918); Deposition of J. Fitzgibbon; Dated: Mar. 16, 1999.
(Continued)

*Primary Examiner* — Vernal Brown
(74) *Attorney, Agent, or Firm* — Fitch Even Tabin & Flannery LLP

(57) ABSTRACT

A rolling code transmitter is useful in a security system for providing secure encrypted RF transmission comprising an interleaved trinary bit fixed code and rolling code. A receiver demodulates the encrypted RF transmission and recovers the fixed code and rolling code. Upon comparison of the fixed and rolling codes with stored codes and determining that the signal has emanated from an authorized transmitter, a signal is generated to actuate an electric motor to open or close a movable barrier.

13 Claims, 16 Drawing Sheets

(56) References Cited

U.S. PATENT DOCUMENTS

| | | |
|---|---|---|
| 3,735,106 A | 5/1973 | Hollaway |
| 3,792,446 A | 2/1974 | McFiggins et al. |
| 3,798,359 A | 3/1974 | Feistel |
| 3,798,360 A | 3/1974 | Feistel |
| 3,798,544 A | 3/1974 | Norman |
| 3,798,605 A | 3/1974 | Feistel |
| 3,845,277 A | 10/1974 | Voss et al. |
| 3,890,601 A | 6/1975 | Pietrolewicz |
| 3,906,348 A | 9/1975 | Willmott |
| 3,938,091 A | 2/1976 | Atalla et al. |
| 4,037,201 A | 7/1977 | Willmott |
| 4,064,404 A | 12/1977 | Willmott et al. |
| RE29,525 E | 1/1978 | Willmott |
| 4,078,152 A | 3/1978 | Tuckerman, III |
| 4,138,735 A | 2/1979 | Allocca et al. |
| 4,178,549 A | 12/1979 | Ledenbach et al. |
| 4,195,196 A | 3/1980 | Feistel |
| 4,195,200 A | 3/1980 | Feistel |
| 4,196,310 A | 4/1980 | Forman et al. |
| 4,218,738 A | 8/1980 | Matyas et al. |
| 4,304,962 A | 12/1981 | Fracassi et al. |
| 4,305,060 A | 12/1981 | Apple et al. |
| 4,316,055 A | 2/1982 | Feistel |
| 4,326,098 A | 4/1982 | Bouricius et al. |
| 4,327,444 A | 4/1982 | Court |
| 4,328,414 A | 5/1982 | Atalla |
| 4,328,540 A | 5/1982 | Matsuoka et al. |
| RE30,957 E | 6/1982 | Feistel |
| 4,380,762 A | 4/1983 | Capasso |
| 4,385,296 A | 5/1983 | Tsubaki et al. |
| 4,393,269 A | 7/1983 | Konheim et al. |
| 4,418,333 A | 11/1983 | Schwarzbach et al. |
| 4,426,637 A | 1/1984 | Apple et al. |
| 4,445,712 A | 5/1984 | Smagala-Romanoff |
| 4,447,890 A | 5/1984 | Duwel et al. |
| 4,454,509 A | 6/1984 | Buennagel et al. |
| 4,464,651 A | 8/1984 | Duhame |
| 4,471,493 A | 9/1984 | Schober |
| 4,491,774 A | 1/1985 | Schmitz |
| 4,509,093 A | 4/1985 | Stellberger |
| 4,529,980 A | 7/1985 | Liotine et al. |
| 4,535,333 A | 8/1985 | Twardowski |
| 4,574,247 A | 3/1986 | Jacob |
| 4,578,530 A | 3/1986 | Zeidler |
| 4,580,111 A | 4/1986 | Swanson |
| 4,581,606 A | 4/1986 | Mallory |
| 4,590,470 A | 5/1986 | Koenig |
| 4,593,155 A | 6/1986 | Hawkins |
| 4,596,898 A | 6/1986 | Pemmaraju |
| 4,596,985 A | 6/1986 | Bongard et al. |
| 4,599,489 A | 7/1986 | Cargile |
| 4,602,357 A | 7/1986 | Yang et al. |
| 4,611,198 A | 9/1986 | Levinson et al. |
| 4,623,887 A | 11/1986 | Welles, II |
| 4,626,848 A | 12/1986 | Ehlers |
| 4,628,315 A | 12/1986 | Douglas |
| 4,630,035 A | 12/1986 | Stahl et al. |
| 4,633,247 A | 12/1986 | Hegeler |
| 4,638,433 A | 1/1987 | Schindler |
| 4,646,080 A | 2/1987 | Genest et al. |
| 4,652,860 A | 3/1987 | Weishaupt et al. |
| 4,653,076 A | 3/1987 | Jerrim et al. |
| 4,670,746 A | 6/1987 | Taniguchi et al. |
| 4,686,529 A | 8/1987 | Kleefeldt |
| 4,695,839 A | 9/1987 | Barbu et al. |
| 4,703,359 A | 10/1987 | Rumbolt et al. |
| 4,710,613 A | 12/1987 | Shigenaga |
| 4,716,301 A | 12/1987 | Willmott et al. |
| 4,720,860 A | 1/1988 | Weiss |
| 4,723,121 A | 2/1988 | van den Boom et al. |
| 4,731,575 A | 3/1988 | Sloan |
| 4,737,770 A | 4/1988 | Brunius et al. |
| 4,740,792 A | 4/1988 | Sagey et al. |
| 4,750,118 A | 6/1988 | Heitschel et al. |
| 4,754,255 A | 6/1988 | Sanders et al. |
| 4,755,792 A | 7/1988 | Pezzolo et al. |
| 4,758,835 A | 7/1988 | Rathmann et al. |
| 4,761,808 A | 8/1988 | Howard |
| 4,779,090 A | 10/1988 | Micznik et al. |
| 4,794,268 A | 12/1988 | Nakano et al. |
| 4,794,622 A | 12/1988 | Isaacman et al. |
| 4,796,181 A | 1/1989 | Wiedemer |
| 4,799,061 A | 1/1989 | Abraham et al. |
| 4,800,590 A | 1/1989 | Vaughan |
| 4,802,114 A | 1/1989 | Sogame |
| 4,804,938 A | 2/1989 | Rouse et al. |
| 4,807,052 A | 2/1989 | Amano |
| 4,808,995 A | 2/1989 | Clark et al. |
| 4,825,200 A | 4/1989 | Evans et al. |
| 4,825,210 A | 4/1989 | Bachhuber et al. |
| 4,831,509 A | 5/1989 | Jones et al. |
| 4,835,407 A | 5/1989 | Kataoka et al. |
| 4,845,491 A | 7/1989 | Fascenda et al. |
| 4,847,614 A | 7/1989 | Keller |
| 4,855,713 A | 8/1989 | Brunius |
| 4,856,081 A | 8/1989 | Smith |
| 4,859,990 A | 8/1989 | Isaacman |
| 4,870,400 A | 9/1989 | Downs et al. |
| 4,878,052 A | 10/1989 | Schulze |
| 4,881,148 A | 11/1989 | Lambropoulos et al. |
| 4,885,778 A | 12/1989 | Weiss |
| 4,888,575 A | 12/1989 | De Vaulx |
| 4,890,108 A | 12/1989 | Drori et al. |
| 4,905,279 A | 2/1990 | Nishio |
| 4,910,750 A | 3/1990 | Fisher |
| 4,912,463 A | 3/1990 | Li |
| 4,914,696 A | 4/1990 | Dudczak et al. |
| 4,918,690 A | 4/1990 | Markkula, Jr. et al. |
| 4,922,168 A | 5/1990 | Waggamon et al. |
| 4,922,533 A | 5/1990 | Philippe |
| 4,928,098 A | 5/1990 | Dannhaeuser |
| 4,931,789 A | 6/1990 | Pinnow |
| 4,939,792 A | 7/1990 | Urbish et al. |
| 4,942,393 A | 7/1990 | Waraksa et al. |
| 4,951,029 A | 8/1990 | Severson |
| 4,963,876 A | 10/1990 | Sanders et al. |
| 4,979,832 A | 12/1990 | Ritter |
| 4,980,913 A | 12/1990 | Skret |
| 4,988,992 A | 1/1991 | Heitschel et al. |
| 4,992,783 A | 2/1991 | Zdunek et al. |
| 4,999,622 A | 3/1991 | Amano et al. |
| 5,001,332 A | 3/1991 | Schrenk |
| 5,023,908 A | 6/1991 | Weiss |
| 5,049,867 A | 9/1991 | Stouffer |
| 5,055,701 A | 10/1991 | Takeuchi |
| 5,058,161 A | 10/1991 | Weiss |
| 5,060,263 A | 10/1991 | Bosen et al. |
| 5,103,221 A | 4/1992 | Memmola |
| 5,107,258 A | 4/1992 | Soum |
| 5,126,959 A | 6/1992 | Kurihara |
| 5,144,667 A | 9/1992 | Pogue, Jr. et al. |
| 5,146,067 A | 9/1992 | Sloan et al. |
| 5,148,159 A | 9/1992 | Clark et al. |
| 5,153,581 A | 10/1992 | Hazard |
| 5,159,329 A | 10/1992 | Lindmayer et al. |
| 5,168,520 A | 12/1992 | Weiss |
| 5,193,210 A | 3/1993 | Nicholas et al. |
| 5,224,163 A | 6/1993 | Gasser et al. |
| 5,237,614 A | 8/1993 | Weiss |
| 5,252,960 A | 10/1993 | Duhame |
| 5,278,907 A | 1/1994 | Snyder et al. |
| 5,280,527 A | 1/1994 | Gullman et al. |
| 5,331,325 A | 7/1994 | Miller |
| 5,361,062 A | 11/1994 | Weiss et al. |
| 5,363,448 A | 11/1994 | Koopman, Jr. et al. |
| 5,365,225 A | 11/1994 | Bachhuber |
| 5,367,572 A | 11/1994 | Weiss |
| 5,369,706 A | 11/1994 | Latka |
| 5,412,379 A | 5/1995 | Waraksa et al. |
| 5,414,418 A | 5/1995 | Andros, Jr. |
| 5,420,925 A | 5/1995 | Michaels |
| 5,442,341 A | 8/1995 | Lambropoulos |
| 5,444,737 A | 8/1995 | Cripps et al. |
| 5,463,376 A | 10/1995 | Stoffer |

(56) References Cited

U.S. PATENT DOCUMENTS

| | | | |
|---|---|---|---|
| 5,471,668 | A | 11/1995 | Soenen et al. |
| 5,473,318 | A | 12/1995 | Martel |
| 5,479,512 | A | 12/1995 | Weiss |
| 5,485,519 | A | 1/1996 | Weiss |
| 5,517,187 | A | 5/1996 | Bruwer et al. |
| 5,528,621 | A | 6/1996 | Heiman et al. |
| 5,530,697 | A | 6/1996 | Watanabe |
| 5,554,977 | A | 9/1996 | Jablonski et al. |
| RE35,364 | E | 10/1996 | Heitschel et al. |
| 5,563,600 | A | 10/1996 | Miyake |
| 5,594,429 | A | 1/1997 | Nakahara |
| 5,598,475 | A | 1/1997 | Soenen et al. |
| 5,608,723 | A | 3/1997 | Felsenstein |
| 5,657,388 | A | 8/1997 | Weiss |
| 5,678,213 | A | 10/1997 | Myer |
| 5,680,131 | A | 10/1997 | Utz |
| 5,686,904 | A | 11/1997 | Bruwer |
| 5,745,068 | A | 4/1998 | Takahashi et al. |
| 5,774,065 | A | 6/1998 | Mabuchi et al. |
| 5,778,348 | A | 7/1998 | Manduley et al. |
| 5,872,519 | A | 2/1999 | Issa et al. |
| 5,898,397 | A | 4/1999 | Murray |
| 5,936,999 | A | 8/1999 | Keskitalo |
| 5,937,065 | A | 8/1999 | Simon et al. |
| 6,154,544 | A | 11/2000 | Farris et al. |
| 6,166,650 | A | 12/2000 | Bruwer |
| 6,175,312 | B1 | 1/2001 | Bruwer et al. |
| 6,275,519 | B1 | 8/2001 | Hendrickson |
| 6,463,538 | B1 | 10/2002 | Elteto |
| 6,690,796 | B1 | 2/2004 | Farris et al. |
| 6,810,123 | B2 | 10/2004 | Farris et al. |
| 6,980,655 | B2 | 12/2005 | Farris et al. |
| 7,332,999 | B2 | 2/2008 | Fitzgibbon |
| 7,412,056 | B2 | 8/2008 | Farris et al. |
| 7,492,905 | B2 | 2/2009 | Fitzgibbon |
| 7,623,663 | B2 | 11/2009 | Farris et al. |
| 2006/0109978 | A1 | 5/2006 | Farris et al. |

FOREIGN PATENT DOCUMENTS

| | | |
|---|---|---|
| DE | 3244049 | 9/1984 |
| DE | 3309802 | 9/1984 |
| DE | 3320721 | 12/1984 |
| DE | 3407436 | 8/1985 |
| DE | 3407469 | 9/1985 |
| DE | 3532156 | 3/1987 |
| DE | 3636822 | 10/1987 |
| DE | 4204463 | 8/1992 |
| EP | 0043270 | 1/1982 |
| EP | 0103790 | 3/1984 |
| EP | 0154019 | 9/1985 |
| EP | 0155378 | 9/1985 |
| EP | 0244322 | 11/1987 |
| EP | 0244332 | 11/1987 |
| EP | 0335912 | 6/1988 |
| EP | 0311112 | 4/1989 |
| EP | 0372285 | 6/1990 |
| EP | 0459781 | 12/1991 |
| EP | 0857842 | 8/1998 |
| FR | 2607544 | 3/1988 |
| FR | 2606232 | 6/1988 |
| FR | 2685520 | 6/1993 |
| GB | 1156279 | 6/1969 |
| GB | 2023899 | 1/1980 |
| GB | 2051442 | 4/1981 |
| GB | 2099195 | 12/1982 |
| GB | 2118614 | 11/1983 |
| GB | 2131992 | 6/1984 |
| GB | 2133073 | 7/1984 |
| GB | 2184774 | 7/1987 |
| GB | 2254461 | 10/1992 |
| GB | 2265482 | 9/1993 |
| JP | H6205474 | 7/1994 |
| WO | PCTAU9300137 | 10/1993 |
| WO | WO9320538 | 10/1993 |
| WO | PCTFR9301140 | 5/1994 |
| WO | WO9411829 | 5/1994 |
| WO | PCTDE9400147 | 8/1994 |
| WO | WO9418036 | 8/1994 |

OTHER PUBLICATIONS

*Microchip* v. *The Chamberlain Group, Inc.*, Civil Action No. 98-C-6138; (TCG024334-24357); Declaration of V. Thomas Rhyne; Dated: Feb. 22, 1999.

MM57HS01 HiSeC.TM. Fixed and Rolling Code Decoder, National Semiconductor, Nov. 11, 1994, 1-8.

Morris, Robert. "The Hagelin Cipher Machine (M-209): Reconstruction of the Internal Settings", 2(3): pp. 267-289, Cryptologia, Jul. 1978.

Newman, David B., Jr. et al., "Public Key Management for Network Security", pp. 11-16, IEEE Network Magazine, 1987.

Nickels, Hamilton, "Secrets of Making and Breading Codes" Paladin Press, 1990, pp. 11-29.

Niederreiter, Harald. "Keystream Sequences with a Good Linear Complexity Profile for Every Starting Point", pp. 523-532, Proceedings of Eurocrypt 89, 1989.

NM95HS01/NM95HS02 HiSeC.TM. (High Security Code) Generator, National Semiconductor, Jan. 1995, 1-19.

Otway, Dave and Rees, Owen. "Efficient and Timely Mutual Authentication", pp. 8-11, Jan. 1987.

Peebles, Jr., Peyton Z. and Giuma, Tayeb A.; "Principles of Electrical Engineering" McGraw Hill, Inc., 1991, pp. 562-597.

Peyret, Patrice et al. "Smart Cards Provide Very High Security and Flexibility in Subscribers Management", 744-752, IEEE Transactions on Consumer Electronics, 36(3): Aug. 1990.

Postel, J. ed. "DOD Standard Transmission Control Protocol", pp. 52-133, Jan. 1980.

Postel, Jonathan B. et al., "The ARPA Internet Protocol", pp. 261-271, 1981.

Reed, David P. and Kanodia, Rajendra K. "Synchronization With Eventcounts and Sequencers", vol. 22, No. 2, pp. 115-123, Communications of the ACM, Feb. 1979.

Reynolds, J. and J. Postel. "Official ARPA-Internet Protocols", Network Working Groups, Apr. 1985.

Roden, Martin S., "Analog and Digital Communication Systems," Third Edition, Prentice Hall, 1979, pp. 282-460.

Ruffell, J. "Battery Low Indicator," p. 59, Eleckton Electronics 15-165, Mar. 1989.

Saab Anti-Theft System: "Saab's Engine Immobilizing Anti-Theft System is a Road-Block for Code-Grabbing Thieves", pp. 1-2, Aug. 1996; http://www.saabusa.com/news/newsindex/alarm.html.

Savage, J.E. "Some Simple Self-Synchronizing Digital Data Scramblers", pp. 449-487, The Bell System Tech. Journal, Feb. 1967.

Schedule of Confidential Non-Patent Literature Documents; Apr. 1, 2008.

Seberry, J. and Pieprzyk, Cryptography—An Introduction to Computer Security, Prentice Hall of Australia, YTY Ltd, 1989, pp. 134-136.

Shamir, Adi. "Embedding Cryptographic Trapdoors in Arbitrary Knapsack Systems", pp. 77-79, Information Processing Letters, 1983.

Siegenthaler, T. "Decrypting a Class of Stream Ciphers Using Ciphertext Only", vol. C-34, No. 1, pp. 81-85, IEEE Transactions on Computers, Jan. 1985.

Simmons, Gustavus J. "Message Authentication With Arbitration of Transmitter/Receiver Disputes", pp. 151-165, 1987.

Smith, J.L. et al. "An Experimental Application of Cryptography to a Remotely Accessed Data System", Proceedings of the ACM, pp. 282-297, Aug. 1972.

Smith, J.L. The Design of Lucifer: A Cryptographic Device for Data Communications, pp. 1-65, Apr. 15, 1971.

Smith, Jack, "Modem Communication Circuits" McGraw-Hill Book Company, 1986, Chapter 11, pp. 420-454.

Smith, Jack, "Modem Communication Circuits" McGraw-Hill Book Company, 1986, Chapter 7, pp. 231-294.

(56) References Cited

OTHER PUBLICATIONS

Svigals, J. "Limiting Access to Data in an Identification Card Having a Micro-Processor", IBM: Technical Disclosure Bulletin, vol. 27, No. 1B, pp. 580-581, Jun. 1984.
Thatcham: The Motor Insurance Repair Research Centre, The British Insurance Industry's Criteria for Vehicle Security (Jan. 1993) (Lear 18968-19027), pp. 1-36.
Turn, Rein. "Privacy Transformations for Databank Systems", pp. 589-601, National Computer Conference, 1973.
U.S. District Court, Northern District of Illinois, Eastern Division, Civil Action No. 05-C-3449, Declaration of Robert Louis Stevenson, Jr., Jun. 26, 2009.
U.S. District Court, Northern District of Illinois, Eastern Division, Civil Action No. 05-C-3449, JCI's Local Rule 56.1 Statement of Undisputed Facts in Support of Their Motion for Summary Judgment of Infringement of the '056 Patent; Jul. 6, 2009.
U.S. District Court, Northern District of Illinois, Eastern Division, Civil Action No. 05-C-3449, JCI's Local Rule 56.1 Statement of Undisputed Facts in Support of Their Motion for Summary Judgment of Infringement of the '544 Patent; Jul. 6, 2009.
U.S. District Court, Northern District of Illinois, Eastern Division, Civil Action No. 05-C-3449, JCI's Memorandum of Law in Support of its Motion for Summary Judgment of Infringement of the '056 Patent, Jul. 6, 2009.
U.S. District Court, Northern District of Illinois, Eastern Division, Civil Action No. 05-C-3449, JCI's Memorandum of Law in Support of its Motion for Summary Judgment of Infringement of the '544 Patent, Jul. 6, 2009.
U.S. District Court, Northern District of Illinois, Eastern Division, Civil Action No. 05-C-3449, Memorandum Opinion and Order, Nov. 24, 2010.
U.S. District Court, Northern District of Illinois, Eastern Division, Civil Action No. 05-CV-3449, Defendant Lear Corporation's Answer to Plaintiffs' Second Amended Complaint, Defenses, and Counterclaim; Dated Sep. 8, 2008.
U.S. District Court, Northern District of Illinois, Eastern Division, Civil Action No. 05-CV-3449, Defendant Lear Corporation's Answer to Plaintiffs' Second Amended Complaint, Defenses, and Counterclaim; Sep. 8, 2008.
U.S. District Court, Northern District of Illinois, Eastern Division, Civil Action No. 05-CV-3449, Defendant Lear Corporation's Reply Memorandum in Support of Its Motion to Stay Effectiveness of Any Preliminary Injunction; Apr. 17, 2007.
U.S. District Court, Northern District of Illinois, Eastern Division, Civil Action No. 05-CV-3449, Lear Corporation Memorandum of Law in Support of Its Motion for Summary Judgment of U.S. Patent No. 7,412,056; Dec. 8, 2008.
U.S. District Court, Northern District of Illinois, Eastern Division, Civil Action No. 05-CV-3449, Lear Corporation's Answer, Affirmative Defenses and Counterclaims to Plaintiffs' Amended Complaint; Oct. 24, 2005.
U.S. District Court, Northern District of Illinois, Eastern Division, Civil Action No. 05-CV-3449, Lear Corporation's Memorandum of Law in Support of Its Emergency Motion to Stay the Effectiveness of the Preliminary Injunction Memorandum Opinion and Order; Entered: Mar. 30, 2007.
U.S. District Court, Northern District of Illinois, Eastern Division, Civil Action No. 05-CV-3449, Lear Corporation's Motion for Reconsideration of the Court's Sep. 11, 2006 Memorandum Opinion and Order Regarding Claim Construction; Sep. 25, 2006.
U.S. District Court, Northern District of Illinois, Eastern Division, Civil Action No. 05-CV-3449, Lear Corporation's Post-Markman Brief; Jun. 15, 2006.
U.S. District Court, Northern District of Illinois, Eastern Division, Civil Action No. 05-CV-3449, Memorandum Opinion and Order, Apr. 25, 2007.
U.S. District Court, Northern District of Illinois, Eastern Division, Civil Action No. 05-CV-3449, Memorandum Opinion and Order, Feb. 20, 2007.
U.S. District Court, Northern District of Illinois, Eastern Division, Civil Action No. 05-CV-3449, Memorandum Opinion and Order, Sep. 11, 2006.
U.S. District Court, Northern District of Illinois, Eastern Division, Civil Action No. 05-CV-3449, Memorandum Opinion and Order; Mar. 30, 2007.
U.S. District Court, Northern District of Illinois, Eastern Division, Civil Action No. 05-CV-3449, Notice of Motion and Motion for Leave to File Defendant Lear Corporation's Sur-Reply to Chamberlain's and JCI's Reply Memorandum in Support of Motion for Preliminary Injunction Dated Mar. 30, 2006.
U.S. District Court, Northern District of Illinois, Eastern Division, Civil Action No. 05-CV-3449, Notice of Motion and Motion for Leave to File Defendant Lear Corporation's Sur-Reply to Chamberlain's and JCI's Reply Memorandum in Support of Motion for Preliminary Injunction; Dated Mar. 20, 2006.
U.S. District Court, Northern District of Illinois, Eastern Division, Civil Action No. 05-CV-3449, Plaintiffs' Opposition to Lear Corporation's Motion to Stay the Effectiveness of the Preliminary Injunction Memorandum Opinion and Order Entered Mar. 30, 2008.
U.S. District Court, Northern District of Illinois, Eastern Division, Civil Action No. 05-CV-3449, Plaintiffs' Response to Lear's Motion for Reconsideration of the Court's Sep. 11, 2006 Ruling Regarding Claim Construction; Oct. 4, 2006.
U.S. District Court, Northern District of Illinois, Eastern Division, Civil Action No. 05-CV-3449, Plaintiffs' Surreply Memorandum in Opposition to Lear's Motion to Stay the Preliminary Injunction, Apr. 24, 2007.
U.S. District Court, Northern District of Illinois, Eastern Division, Civil Action No. 05-CV-3449, Plaintiffs' Surreply Memorandum in Opposition to Lear's Motion to Stay the Preliminary Injunction; Apr. 20, 2007.
U.S. District Court, Northern District of Illinois, Eastern Division, Civil Action No. 05-CV-3449, Plaintiffs' Surreply Memorandum in Support of Motion for Preliminary Injunction; Jun. 8, 2006.
U.S. District Court, Northern District of Illinois, Eastern Division, Civil Action No. 05-CV-3449, Reply Brief in Support of Lear's Motion for Reconsideration of the Court's Sep. 11, 2006 Ruling Regarding Claim Construction; Oct. 11, 2006.
U.S. District Court, Northern District of Illinois, Eastern Division, Civil Action No. 05-CV-3449, Supplemental Memorandum in Support of Defendant Lear Corporation's Opposition to Plaintiffs' Motion for Preliminary Injunction, Mar. 2, 2007.
U.S. District Court, Northern District of Illinois, Eastern Division, Civil Action No. 05-CV-3449, Supplemental Memorandum in Support of Defendant Lear Corporation's Opposition to Plaintiffs' Motion for Preliminary Injunction; Mar. 2, 2007.
U.S. District Court, Northern District of Illinois, Eastern Division, Civil Action No. 05-CV-3449, Transcript of Deposition of Bradford L. Farris, Jan. 12, 2006.
U.S. District Court, Northern District of Illinois, Eastern Division, Civil Action No. 05-CV-3449, Transcript of Deposition of Hubert E. Dunsmore, Jan. 12, 2006.
U.S. District Court, Northern District of Illinois, Eastern Division, Civil Action No. 05-CV-3449, Transcript of Proceedings Before the Honorable James B. Moran, May 31, 2006.
United States Court of Appeals for the Federal Circuit, Appeal from the United States District Court for the Northern District of Illinois in Case No. 05-CV-3449, Brief of Defendant-Appellant Lear Corporation; Jun. 18, 2007.
United States Court of Appeals for the Federal Circuit, Appeal from the United States District Court for the Northern District of Illinois in Case No. 05-CV-3449, Brief of the Chamberlain Group, Inc. and Johnson Controls Interiors LLC; Aug. 8, 2007.
United States Court of Appeals for the Federal Circuit, Appeal from the United States District Court for the Northern District of Illinois in Case No. 05-CV-3449, Combined Petition for Panel Rehearing and Rehearing En Banc of Chamberlain Group, Inc. and Johnson Controls Interiors LLC; Dated Mar. 19, 2008.
United States Court of Appeals for the Federal Circuit, Appeal from the United States District Court for the Northern District of Illinois in Case No. 05-CV-3449, Reply Brief of Defendant-Appellant Lear Corporation, Aug. 27, 2007.

(56) References Cited

OTHER PUBLICATIONS

United States Court of Appeals for the Federal Circuit, Appeal from the United States District Court for the Northern District of Illinois in Case No. 05-CV-3449, Reply Brief of Defendant-Appellant Lear Corporation, Aug. 29, 2007.
United States Court of Appeals for the Federal Circuit, Appeal from the United States District Court for the Northern District of Illinois in Case No. 05-CV-3449, Response of Defendant-Appellant Lear Corporation to Combined Petition for Panel Rehearing and En Blanc of Chamberlain Group Inc. and Johnson Controls Interior LLC; Dated Mar. 8, 2008.
United States Court, Northern District of Illinois, Eastern Division, Civil Action 05 C 3449, Notice Pursuant to 35 U.S.C. 282, Mar. 4, 2011.
United States International Trade Commission in the Matter of Certain Code Hopping Remote Control Systems, Including Components and Integrated Circuits Used Therein; Investigation No. 337-TA-417; Expert Report of Dr. V. Thomas Rhyne;(TCG019919-19959); Partially redacted; Dated Jul. 7, 1999.
United States International Trade Commission, Washington, D., Investigation No. 337-TA-417; Respondents' Answer to Complaint and Notice of Investigation, Jan. 26, 1999.
US. District Court, Northern District of Illinois, Eastern Division, Civil Action No. 05-CV-3449, Lear Corporation Memorandum of Law inSupport of Its Motion for Summary Judgement of U.S. Patent No. 7,412,056; Dated: Dec. 8, 2008.
Voydock, Victor L. and Kent, Stephen T. "Security in High-Level Network Protocols", IEEE Communications Magazine, pp. 12-25, vol. 23, No. 7, Jul. 1985.
Voydock, Victor L. and Kent, Stephen T. "Security Mechanisms in a Transport Layer Protocol", Computers & Security, 325-341, 1985.
Voydock, Victor L. and Kent, Stephen T. "Security Mechanisms in High-Level Network Protocols", Computing Surveys, pp. 135-171, vol. 15, No. 2, Jun. 1983.
Watts, Charles and Harper, Jon, How to Design a HiSeC.TM. Transmitter, National Semiconductor, Oct. 1994, 1-4.
Watts, Charles, How to Program the HiSeC.TM. Remote Keyless Entry Rolling Code Generator, National Semiconductor, Oct. 1994, 1-14.
Weinstein, S.B. "Smart credit cards: the answer to cashless shopping", IEEE Spectrum, pp. 43-49, Feb. 1984.
Weissman, C. "Security controls in the ADEPT-50 time-sharing system", AFIPS Full Joint Computer Conference, pp. 119-133, 1969.
Welsh, Dominic, Codes and Cryptography, pp. 7.0-7.1 Clarendon Press, 1988.
Whitfield Diffie and Martin E. Hellman, Privacy and Authentication: An Introduction to Cryptography, Proceedings of the IEEE, vol. 67, No. 3, Mar. 1979, 397-427.
Wolfe, James Raymond, "Secret Writing—The Craft of the Cryptographer" McGraw-Hill Book Company 1970, pp. 111-122, Chapter 10.
"Access Transmitters—Access Security System", pp. 1-2, Undated. http://www.webercreations.com/access/security.httnl.
"News: Key system for security", p. 68, Apr. 1982.
"Secure Terminal Interface Module for Smart Card Applications", IBM: Technical Disclosure Bulletin, vol. 28, No. 4, pp. 1488-1489, Sep. 1985.
"Transaction Completion Code Based on Digital Signatures", IBM: Technical Disclosure Bulletin, vol. 28, No. 3, pp. 1109-1122, Aug. 1985.
Abrams, and Podell, "Tutorial Computer and Network Security," District of Columbia: IEEE, 1987. pp. 1075-1081.
Abramson, Norman. "The Aloha System—Another alternative for computer communications," pp. 281-285, University of Hawaii, 1970.
Adams, Russ, Classified, data-scrambling program for Apple II, Info-World, vol. 5, No. 3; Jan. 31, 1988.
Alexi, Werner, et al. "RSA and Rabin Functions: Certain Parts are as Hard as the Whole", pp. 194-209, Siam Computing, vol. 14, No. 2, Apr. 1988.
Allianz Allianz-Zentrum for Technik GmbH—"Detailed requirements for fulfilling the specification profile for electronically coded OEM immobilizers", Issue 22, Jun. 1994 (Translation Jul. 5, 1994).
Anderson, Ross. "Searching for the Optimum Correlation Attack", pp. 136-143, Computer Laboratory, Pembroke Street, Cambridge CB2 3QG, Copyright 1995.
Arazi, Benjamin, Vehicular Implementations of Public Key Cryptographic Techniques, IEEE Transactions on Vehicular Technology, vol. 40, No. 3, Aug. 1991, 646-653.
Baran, P. Distribution Communications, vol. 9, "Security Secrecy and Tamper-free Communications", Rand Corporation, 1964.
Barbaroux, Paul. "Uniform Results in. Polynomial-Time Security", pp. 297-306, Advances in Cryptology—Eurocrypt 92, 1992.
Barlow, Mike, "A Mathematical Word Block Cipher," 12 Cryptologia 256-264 (1988).
Bellovin, S.M. "Security Problems in the TCPIIP Protocol Suite", pp. 32-49, Computer Communication Review, New Jersey, Reprinted from Computer Communication Review, vol. 19, No. 2, pp. 32-48, Apr. 1989.
Beutelspacher, Albrecht. Advances in Cryptology-Eurocrypt 87: "Perfect and Essentially Perfect Authentication Schemes" (Extended Abstract), pp. 167-170, Federal Republic of Germany, Copyright 1998, Springer-Verlag.
Bloch, Gilbert. "Enigma Before Ultra Polish Work and the French Contribution", 11(3): 142-155, Cryptologia, Jul. 1987.
Bosworth, Bruce, "Codes, Ciphers, and Computers: An Introduction to Information Security" Hayden Book Company, Inc. 1982, pp. 30-54.
Brickell, Ernest F. and Stinson, Doug. "Authentication Codes With Multiple Arbiters", pp. 51-55, Proceedings of Eurocrypt 88, 1988.
Bruwer, Frederick J. "Die Toepassing Van Gekombineerde Konvolusiekodering en Modulasie op HF-Datakommuikasie," District of Pretoria in South Africa Jul. 1998.
Burger, Chris R., Secure Learning RKE Systems Using KeeLoq. RTM. Encoders, TB001, 1996 Microchip Technology, Inc., 1-7.
Burmeister, Mike. "A Remark on the Efficiency of Identification Schemes", pp. 493-495, Advances in Cryptology—Eurocrypt 90, 1990.
Cattermole, K.W., "Principles of Pulse Code Modulation" Iliffe Books Ltd., 1969, pp. 30-381.
Cerl, Vinton a "Issues in Packet-Network Interconnection", pp. 1386-1408, Proceedings of the IEEE, 66(11), Nov. 1978.
Cerf, Vinton G. and Kahn, Robert E. "A Protocol for Packet Network Intercommunication", pp. 637-648, Transactions on Communications, vol. Com-22, No. 5, May 1974.
Computer Arithmetic by Henry Jacobowitz; Library of Congress Catalog Card No. 62-13396; Copyright Mar. 1962 by John F. Rider Publisher, Inc.
Conner, Doug, Cryptographic Techniques—Secure Your Wireless Designs, EDN (Design Feature), Jan. 18, 1996, 57-68.
Coppersmith, Don. "Fast Evaluation of Logarithms in Fields of Characteristic Two", IT-30(4): pp. 587-594, IEEE Transactions on Information Theory, Jul. 1984.
Daniels, George, "Pushbutton Controls for Garage Doors" Popular Science (Aug. 1959), pp. 156-160.
Davies, D.W. and Price, W.C. "Security for Computer Networks," John Wiley and Sons, 1984. Chapter 7, pp. 175-176.
Davies, Donald W., "Tutorial: The Security of Data in Networks," pp. 13-17, New York: IEEE, 1981.
Davis, Ben and DeLong, Ron, Combined Remote Key Control and Immobilization System for Vehicle Security, Power Electronics in Transportation, IEEE Catalogue No. 96TH8184, Oct. 24, 1996, 125-132.
Davis, Gregory and Palmer, Morris. "Self-Programming, Rolling-Code Technology Creates Nearly Unbreakable RF Security", Technological Horizons, Texas Instruments, Inc. (ECN), Oct. 1996.
Dawson, Steven, Keeloq.RTM. Code Hopping Decoder Using Secure Learn, AN662, 1997 Microchip Technology, Inc., 1-16.
De Soete, Marijke. "Some Constructions for Authentication-Secrecy Codes", pp. 57-75, Advances in Cryptology-4 Eurocrypt 88, C.G. Gunther, editor. Lecture Notes in Computer Science, vol. 434, Springer-Verlag, Berlin, 1988. pp. 57-76.

(56) References Cited

OTHER PUBLICATIONS

Deavours, C.A. and Kruh, L. "The Swedish HC-9 Ciphering Machine", 251-285, Cryptologia, 13(3): Jul. 1989.
Deavours, C.A. and Reeds, James. "The Enigma, Part 1, Historical Perspectives", 381-391, Cryptologia, 1(4): Oct. 1977.
Deavours, Cipher A., et al. "Analysis of the Hebern cryptograph Using Isomorphs", pp. 246-261, Cryptology: Yesterday, Today and Tomorrow, vol. 1, No. 2, Apr. 1977.
Denning, Dorothy E. "A Lattice Model of Secure Information Flow", pp. 236-238, 240, 242, Communications of the ACM, vol. 19, No. 5, May 1976.
Denning, Dorothy E. "Cryptographic Techniques", pp. 135-154, Cryptography and Data Security, 1982. Chapter 3.
Diffie and Hellman, Exhaustive Cryptanalysis of the NB.S Data Encryption Standard, pp. 74-84, Computer, Jun. 1977.
Diffie and Hellman. "Privacy and Authentication: An Introduction to Cryptography," pp. 29-33, Proceedings of the IEEE 67(3), Mar. 1979.
Diffie, Whitfield and Hellman, Martin E. "New Directions in Cryptography", pp. 644-654, IEEE, Transactions on Information Theory, vol. IT-22, No. 6, Nov. 1976.
Diffie, Whitfield and Hellman, Martin, E. "An RSA Laboratories Technical Note", Version 1.4, Revised Nov. 1, 1993.
Dijkstra, E.W. "Hierarchical Ordering of Sequential Processes", pp. 115-138, Acta Informatica 1: 115-138, 1971.
Dijkstra, E.W. 1968. "Co-Operating Sequential Processes", pp. 43-112, In Programming Languages, F. Genuys. Ed., Academic Press, NY.
ElGamal, Taher. "A Public Key Cryptosystem and a Signature Scheme Based on Discrete Logarithms", pp. 469-472, IEEE, Transactions on Information Theory, vol. IT-31, No. 4, Jul. 1985.
ElGamal, Taher. "A Subexponential Time Algorithm for Computing Discrete Logarithms", pp. 473-481, IEEE, Transactions on Information Theory, vol. IT-31, No. 4, Jul. 1985.
Feistel, H., "Cryptography and Computer Privacy," pp. 15-23, Scientific American, May 1973.
Feistel, Horst, Notz, Wm. A. and Smith, J. Lynn. "Some Cryptographic Techniques for Machine-to-Machine Data Communications", pp. 1545-1554, Proceedings of the IEEE, vol. 63, No. 11, Nov. 1975.
Feistel, Horst. "Cryptography and Computer Privacy", pp. 15-23, Scientific American, vol. 228, No. 5, May 1973.
Fenzl, H. and Kliner, A., "Electronic Lock System: Convenient and Safe," pp. 150-153, Siemens Components XXI, Nov. 4, 1987.
Fischer, Elliot. "Uncaging the Hagelin Cryptograph", pp. 89-92, Cryptologia, vol. 7, No. 1, Jan. 1983.
G. Davis, Marcstar.TM. TRC1300 and TRC1315 Remote Control Transmitter/Receiver, Texas Instruments, Sep. 12, 1994, 1-24.
Godlewski, Ph. and Camion P. "Manipulations and Errors, Detection and Localization," pp. 97-106, Proceedings of Eurocrypt 88, 1988.
Gordon, Professor J., Police Scientific Development Branch, Designing Codes for Vehicle Remote Security Systems, (Oct. 1994), pp. 1-20.
Gordon, Professor J., Police Scientific Development Branch, Designing Rolling Codes for Vehicle Remote Security Systems, (Aug. 1993), pp. 1-19.
Greenlee, B.M., "Requirements for Key Management Protocols in the Wholesale Financial Services Industry," pp. 22-28, IEEE Communications Magazine, Sep. 1985.
Guillou, Louis C. "Smart Cards and Conditional Access", pp. 481-489, Proceedings of Eurocrypt, 1984.
Guillou, Louis C. and Quisquater, Jean-Jacques. "A Practical Zero-Knowledge Protocol Fitted to Security Microprocessor Minimizing Both Transmission and Memory", pp. 123-128, Advances in Cryptology—Eurocrypt 88, 1988.
Haberman, A. Nico, "Synchronization of Communicating Processes", pp. 171-176, Communications, Mar. 1972.
Hagelin C-35/C-36 (The), (1 page). Http://hem.passagen.se/tan01/C-35.HTML. Dated Sep. 3, 1998.
Haykin, Simon, "An Introduction to Analog and Digital Communications" 213, 215 (1989).

IEEE 100; The Authoritative Dictionary of IEEE Standards Terms, Seventh Edition, Published by Standards Information Network, IEEE Press, Copyright 2000.
ISO 8732: 1988(E): Banking Key Management (Wholesale) Annex D: Windows and Windows Management, Nov. 1988.
ITC Tutorial; Investigation No. 337-TA-417; (TCG024374-24434); Dated: Jul. 7, 1999.
Jones, Anita K. "Protection Mechanisms and the Enforcement of Security Policies", pp. 228-251, Carnegie-Mellon University, Pittsburgh, PA, 1978.
Jueneman, R.R. et al. "Message Authentication", pp. 29-40, IEEE Communications Magazine, vol. 23, No. 9, Sep. 1985.
Kahn, Robert E. "The Organization of Computer Resources Into a Packet Radio Network", pp. 177-186, National Computer Conference, 1975.
Keeloq NTQ 105 Code Hopping Encoder, Nanoteq (Pty.) Ltd., Jul. 1993, 1-8.
Keeloq. RTM. NTQ 115 Code Hopping Encoder, Nanoteq (Pty.) Ltd., Jul. 1993, 1-8.
Keeloq. RTM. NTQ 125D Code Hopping Decoder, Nanoteq (Pty.) Ltd., Jul. 1993, 1-8.
Keeloq. RTM. NTQ 129D Code Hopping Decoder, Nanoteq (Pty.) Ltd., Jul. 1993, 1-9.
Keeloq.RTM. Code Hopping Decoder, HCS500, 1997 Microchip Technology, Inc., 1-25.
Keeloq.RTM. Code Hopping Encoder, HCS300, 1996 Microchip Technology, Inc., 1-20.
Kent, Stephen T. "A Comparison of Some Aspects of Public-Key and Conventional Cryptosystems", pp. 4.3.1-5, ICC '79 Int. Conf. on Communications; Boston, MA, Jun. 1979.
Kent, Stephen T. "Comments on 'security problems in the TCP/IP protocol suite", Computer Communication Review, vol. 19, Part 3, pp. 10-19, Jul. 1989.
Kent, Stephen T. "Encryption-Based Protection Protocols for Interactive User-Computer Communication", pp. 1-121, (See pp. 50-53) May 1976.
Kent, Stephen T. "Protocol Design Considerations for Network Security", pp. 239-259, Proc. NATO Advanced Study Institute on Interlinking of Computer Networks, 1979.
Kent, Stephen T. "Security requirements and protocols for a broadcast scenario", vol. corn-29, No. 6, pp. 778-786, IEEE Transactions on Communications, Jun. 1981.
Kent, Stephen T. et al. "Personal authentication system for access control to the Defense Data Network", pp. 89-93, Conf. Record of Eascon 82 15th Ann Electronics & Aerospace Systems Conf.; Washington, DC; Sep. 1982.
Konheim, A.G., Cryptography: A Primer, pp. 285-347, New York: John Wiley, 1981.
Koren, Israel, "Computer Arithmetic Algorithms" Prentice Hall, 1978, pp. 1-15.
Kruh, Louis. "Devices and Machines: The Hagelin Cryptographer, Type C-52", pp. 78-82, Cryptologia, vol. 3, No. 2, Apr. 1979.
Kruh, Louis. "How to Use the German Enigma Cipher Machine: A Photographic Essay", pp. 291-296, Cryptologia, vol. No. 7, No. 4, Oct. 1983.
Kuhn, G.J. "Algorithms for Self-Synchronizing Ciphers" Comsig 88, University of Pretoria, Pretoria, pp. 159-164, 1988.
Kuhn, G.J. et al. "A Versatile High-Speed Encryption Chip", (Presented at the INFOSEC '90 Symposium, Pretoria), Mar. 16, 1990.
Lamport, Leslie. "The Synchronization of Independent Processes", pp. 15-34, Acta Informatica, vol. 7, 1976.
Lear Corporation's Memorandum of Law in Support of Its Motion for Summary Judgment; May 22, 2008.
Linn, John and Kent, Stephen T. "Electronic Mail Privacy Enhancement", pp. 40-43, American Institute of Aeronautics and Astronautics, Inc., 1986.
Lloyd, Sheelagh. "Counting Functions Satisfying a Higher Order Strict Avalanche Criterion", pp. 63-74, 1990.
Marneweck, Kobus, Guidelines for KeeLoq.RTM. Secure Learning Implementation, TB007, 1987 Microchip Technology, Inc., 1-5.
Massey, James L. "The Difficulty With Difficulty" (4 pages), Jul. 17, 1976. http://www.iacr.org/conferences/ec96/massey/html/framemassey.html.

(56) References Cited

OTHER PUBLICATIONS

Maurizio Fragano, Solid State Key/Lock Security System, IEEE Transactions on Consumer Electronics, vol. CE-30, No. 4, Nov. 1984, 604-607.

McIvor, Robert. "Smart Cards" pp. 152-159, Scientific American, vol. 253, No. 5, Nov. 1985.

Meier, Willi. "Fast Correlation Attacks on Stream Ciphers", (Extended Abstract), pp. 301-314, Eurocrypt 88, IEEE, 1988.

Meyer, Carl H. and Matyas, Stephen H., Cryptography: A New Dimension in Computer Data Security, pp. 237-249, 1982.

Michener, J. R. The Generalized Rotor Cryptographic Operator and Some of Its Applications, pp. 97-113, Cryptologia, vol. 9, No. 2, Apr. 1985.

Microchip Technology, Inc., Enhanced Flash Microcontrollers with 10-Bit A/D and nano Watt Technology, PIC18F2525/2620/4525/4620 Data Sheet, 28/40/44-Pin, .Copyright. 2008.

*Microchip* v. *The Chamberlain Group, Inc.*, (TCG019794-019873); Deposition of J. Fitzgibbon; Partially redacted; Dated: Jan. 7, 1999.

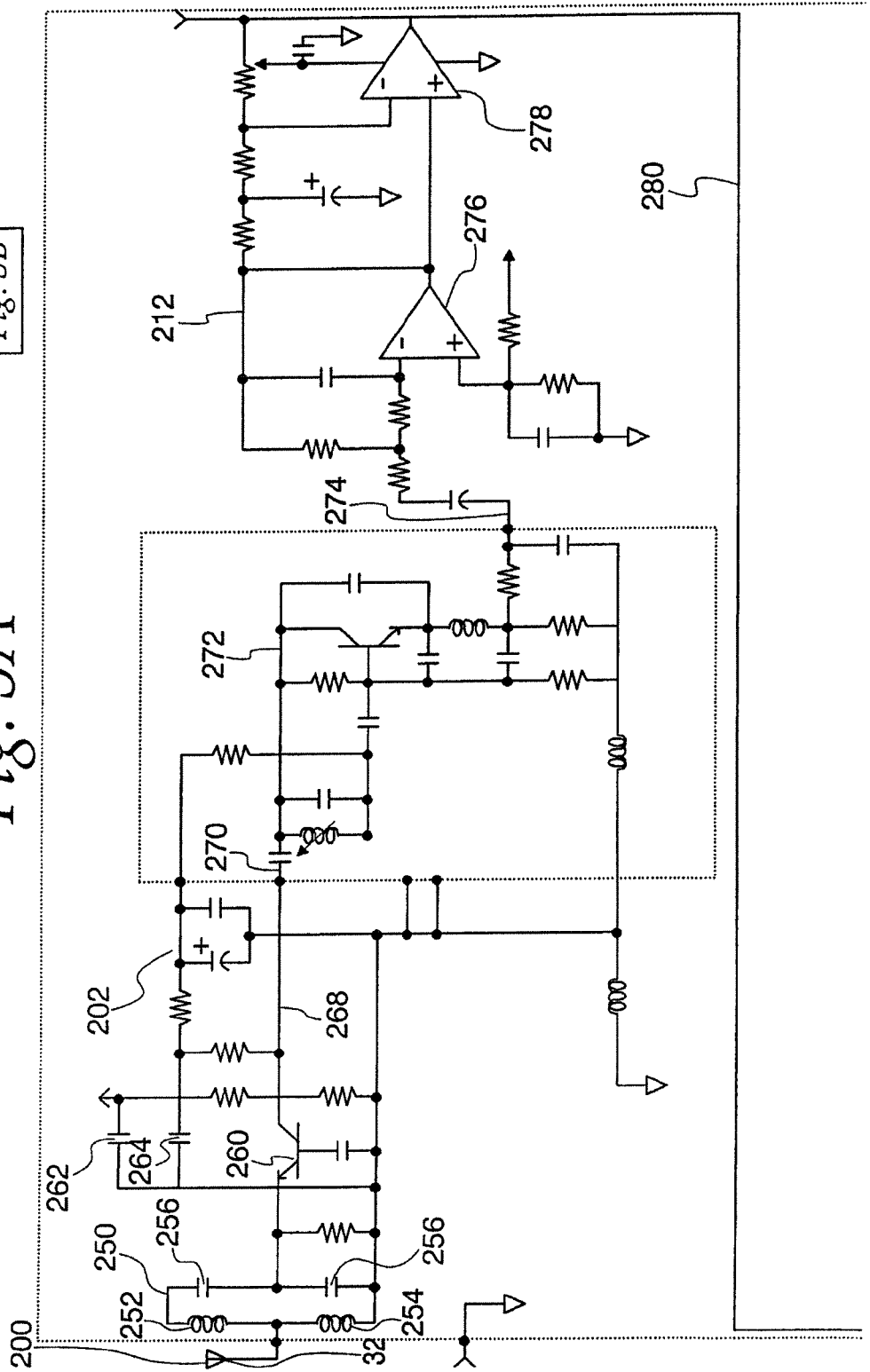

Fig. 5B

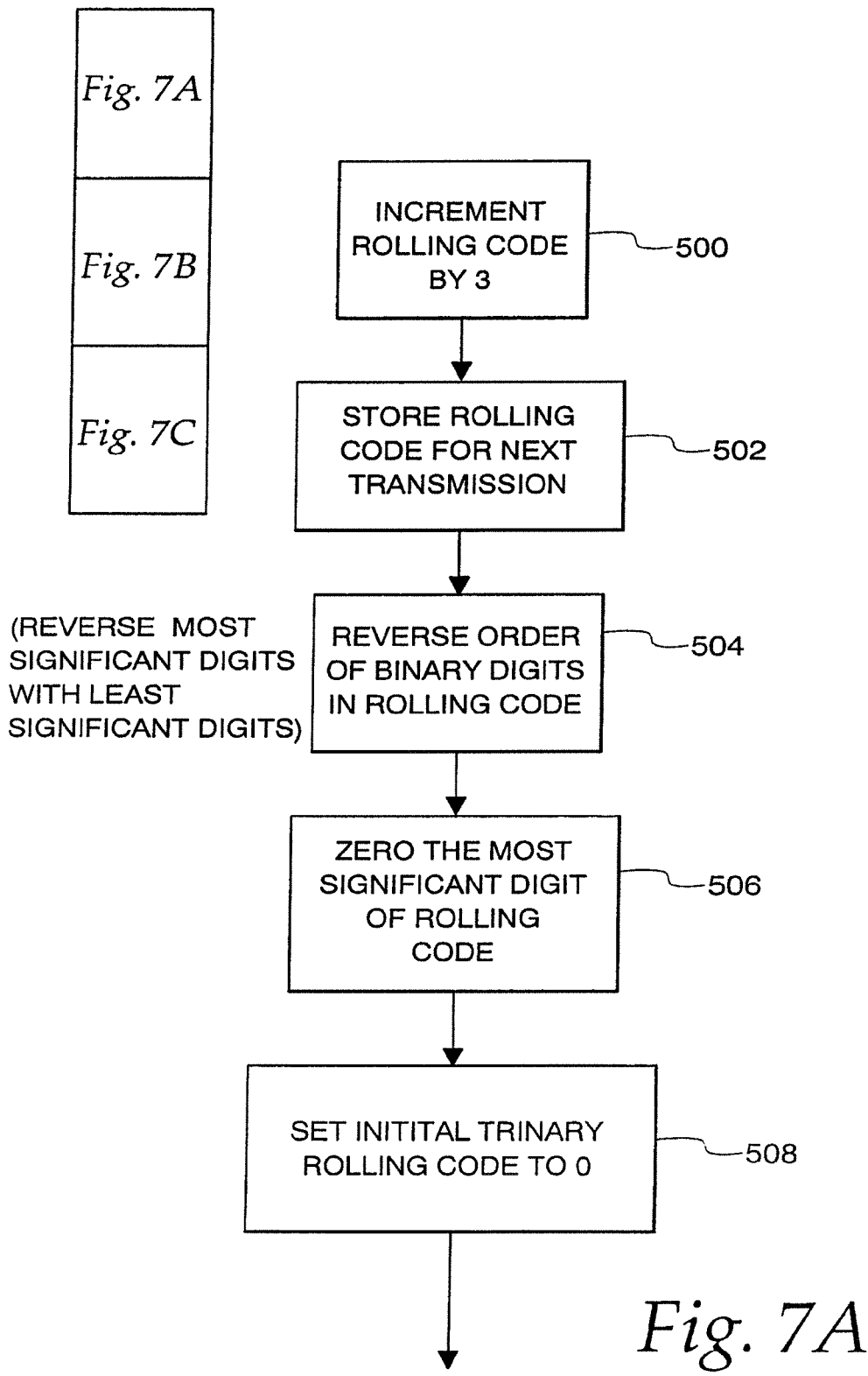

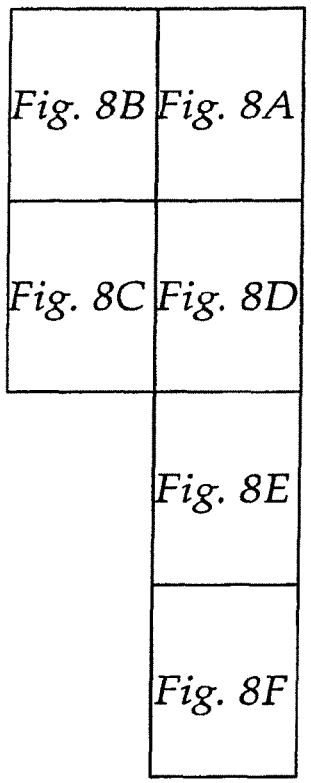
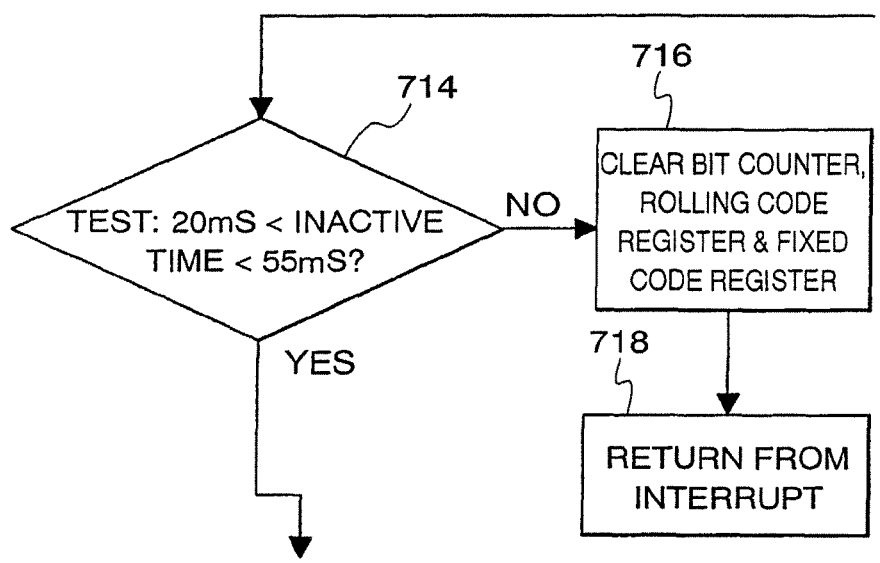
Fig. 8B

ROLLING CODE SECURITY SYSTEM

CROSS-REFERENCE TO RELATED APPLICATIONS

This application is a continuation of U.S. patent application Ser. No. 12/177,366 filed Jul. 22, 2008; which is a continuation of U.S. patent application Ser. No. 11/313,331 filed Dec. 21, 2005, now U.S. Pat. No. 7,623,663; which is a continuation of U.S. patent application Ser. No. 10/884,051 filed Jul. 2, 2004, now U.S. Pat. No. 7,492,898; which is a continuation of U.S. patent application Ser. No. 10/215,900, filed Aug. 9, 2002, now U.S. Pat. No. 6,810,123; which is a continuation of U.S. patent application Ser. No. 09/981,433, filed Oct. 17, 2001, now U.S. Pat. No. 6,980,655; which is a continuation of U.S. patent application Ser. No. 09/489,073, filed Jan. 21, 2000, now U.S. Pat. No. 6,690,796; which is a division of U.S. patent application Ser. No. 08/873,149, filed Jun. 11, 1997, now U.S. Pat. No. 6,154,544; which is a continuation of U.S. patent application Ser. No. 08/446,886, filed May 17, 1995, now abandoned; which are all hereby incorporated by reference in their entireties.

BACKGROUND OF THE INVENTION

The invention relates in general to security systems which allow operation upon the receipt of a properly coded signal. More particularly, the invention relates to a security system or to a barrier operator system, such as a garage door operator, employing a transmitter and a receiver which communicate via code streams having at least a portion thereof which changes with multiple operation of the device.

It is well known in the art to provide garage door operators or other barrier operators which include an electric motor connectable through a transmission to a door or other movable barrier which is to be opened and closed. Since many of these systems are associated with residences, as well as with garages, it is important that opening of the barrier be permitted only by one who is authorized to obtain entry to the area which the barrier protects. Some garage door operator systems have in past employed mechanical lock and key arrangements associated with electrical switches mounted on the outside of the garage. While these systems enjoy a relatively high level of security, they are very inconvenient to use for a person because it necessitates them exiting their vehicle in order to send the command to open the garage door. This also may present some danger to people when they exit the relative security of their vehicle if someone may be waiting to do injury to them.

It is also well known to provide radio-controlled garage door operators which include a garage door operator unit having a radio receiver and a motor connected to be driven from the radio receiver. The radio receiver is adapted to receive radio frequency signals or other electromagnetic signals having particular signal characteristics which, when received, cause the door to be opened. More recently, such transmitter and receiver systems have become relatively more sophisticated in that they use radio transmitters which employ coded transmissions of multiple or three-valued digits, also known as "trinary bits" or other serial coded transmission techniques. Among these systems are U.S. Pat. No. 3,906,348 to Willmott, which employs a transmitter and receiver system wherein a plurality of mechanical switches may be used to set a stored authorization code.

U.S. Pat. No. 4,529,980 to Liotine et al. discloses a transmitter and receiver combination for use in a device such as a garage door operator wherein the transmitter stores an authorization code which is to be transmitted to and received by the receiver via a radio frequency link. In order to alter or update the authorization code contained within the transmitter, the receiver is equipped with a programming signal transmitter or light emitting diode which can send a digitized optical signal back to the transmitter where it is stored. Other systems also employing encoded transmissions are U.S. Pat. Nos. 4,037,201, 4,535,333, 4,638,433, 4,750,118 and 4,988,992.

While each of these devices have provided good security for the user, it is apparent that persons wishing to commit property or person-related crimes have become more sophisticated as well. It is known in the security industry today that devices are being made available that can intercept or steal rolling code.

Transequatorial Technology, Inc. sells integrated circuit code hopping encoders identified as Keeloq Model NTQ105, NTQ115, NTQ125D and NTQ129. Some of the Keeloq code hopping encoders generate serial codes having fixed portions, i.e., which do not change with repeated actuation of the encoding portion of the chip and rolling code portions which alter with each actuation of the encoding portion of the chip. In order to avoid, however, having the problem of the encoding portion of the chip having been inadvertently enabled and causing the rolling code to be altered on successive enabling attempts thereby leading to a rolling code which is transmitted and not recognized by a receiver, the keeloq code hopping encoders provide a window forward system, that is they are operable with systems having code receivers which recognize as a valid code not a single rolling code, but a plurality of rolling codes within a certain code window or window of values which are the values which would be generated on a relatively small number of switch closures as compared to the total number of rolling codes available. The problem with such a system, however, might arise if a user was away for a period of time or had inadvertently caused codes to be transmitted excluding the number of codes normally allowed within the valid forward code window. In that case, the rolling code would not be recognized by the receiver and the user could not gain entry without taking other measures to defeat the locking system or the garage door operator system which might involve the intervention of a trained engineer or technician.

Texas Instruments also has a prior system identified as the Mark Star TRC1300 and TRC1315 remote control transmitter/receiver combination. The System involves the user of a rolling code encoder which increments or rolls potentially the entire code, that is it does not leave a fixed portion. The system also includes a forward windowing function which allows an authorized user to be able to cause the receiver to be enabled within a limited number of key pushes. Like the keeloq system, if the forward window is exceeded, the Texas Instruments system must be placed in a learn mode to cause the system to relearn the code. In order to place the system into the learn mode, the person must obtain direct access to the receiver to cause a programming control system associated with the receiver to be hand actuated causing the receiver to enter a learn mode. Once the receiver has learned the new code, the receiver will then construct a new valid forward code window within which valid rolling codes may be received. The problem, of course, with such a system is that if, for instance in a garage door operator, the only portal of entry to the garage door is through the overhead door controlled by the garage door operator, the user will not be able to obtain entry to the garage without possibly having to do some damage to the structure. This problem is sometimes referred to in the industry as a "vaulted garage."

What is needed is an economical encoding system which provides good security by using a rolling code, but which enables a user of the system to proceed via a gradually degraded pathway in the event that the receiver detects a signal condition indicative of what might be a lack of security.

SUMMARY OF THE INVENTION

The invention relates in general to an electronic system for providing remote security for entry of actuation of a particular device. Such a system may include a transmitter and receiver set, for instance with a hand-held transmitter and a receiver associated with a vehicle such as an automobile or the like. The transmitter, upon signaling the receiver, causing the vehicle to start up or to perform other functions. The system may also be useful in a barrier operator system such as a garage door operator by allowing the garage door to be opened and closed in a relatively secure fashion while preventing persons who may be intercepting the radio frequency signals from being able to, although unauthorized, cause the vehicle to being running or to allow access to the garage.

The system includes a transmitter generally having means for developing a fixed code and a rolling or variable code. The rolling or variable code is changed with each actuation of the transmitter. The fixed code remains the same for each actuation of the transmitter. In the present system, the transmitter. In the present system, the transmitter includes means for producing a 32-bit frame comprising the fixed portion of the code and a second 32-bit frame comprising the variable portion of the code. The 32-bit rolling code is then mirrored to provide a 32-bit mirrored rolling code. The 32-bit mirrored rolling code then has its most significant bit "deleted" by setting it to zero. The transmitter then converts the 32-bit fixed code and the mirrored variable code to a three-valued or trinary bit fixed code and a three-valued or trinary bit variable code or rolling code.

To provide further security, the fixed code and the rolling codes are shuffled so that alternating trinary bits are comprised of a fixed code bit and a rolling code bit to yield a total of 40 trinary bits. The 40 trinary bits are then packaged in a first 20-trinary bit frame and a second 20-trinary bit frame which have proceeding them a single synchronization and/or identification pulse indicating the start of the frame and whether it is the first frame or the second frame. Immediately following each of the frames, the transmitter is placed into a quieting condition to maintain the average power of the transmitter over a typical 100 millisecond interval within legal limits promulgated by the United States Federal Communications Commission. The first trinary frame and the second trinary frame are used to modulate a radio frequency carrier, in this case via muplitude modulation to produce an amplitude modulated encrypted signal. In a preferred embodiment, the radio frequency signal is amplitude modulated. The amplitude modulated signal is then launched and may be received by an AM receiver. In the preferred embodiment, the AM receiver receives the amplitude modulated signal, demodulates it to produce a pair of trinary bit encoded frames. The trinary bits in each of the frames are converted on the fly to 2-bit or half nibbles indicative of the values of the trinary bits which are ultimately used to form two 16-bit fixed code words and two 16-bit variable code words. The two 16-bit fixed code words are used as a pointer to identify the location of a previously stored rolling code value within the receiver. The two 16-bit rolling code words are concatenated by taking the 16-bit words having the more significant bits, multiplying it by $3^{10}$ and then adding it to the second of the words to produce a 32-bit encrypted rolling code. In order to make certain that if the transmitter was inadvertently actuated a number of times, the authorized user can still start his car or gain entry to his garage. The 32-bit encrypted code is then compared via a binary substraction with the stored rolling code. If the 32-bit code is within a window or fixed count, in the present embodiment 1000, the microprocessor produces an authorization signal which is then responded to by other portions of the circuit to cause the garage door to open or close as commanded. In the event that the code is greater than the stored rolling code, plus 1000, indicative of a relatively large number of incrementations, the user is not locked out of the garage, but is allowed to provide further signals or indicia to the receiver that he is an authorized user without any significant degradation of the security. This is done by the receiver entering an alternate mode requiring two or more successive valid codes to be received, rather than just one. If the two or more successive valid codes are received, the garage door will open. However, in order to prevent a person who has previously or recently recorded a recent valid code from being able to obtain access to the garage, a trailing window, in this case starting at a count of 300 less than the present stored count and including all code values between the present stored count and 300 less is compared to the received code. If the received code is within this backward window, the response of the system simply is to take no further action, nor to provide authorization during that code cycle on the assumption that the code has been purloined.

Thus, the present system provides important advantages over the previous garage door operator systems and even previous rolling code systems. The system provides a multiple segmented windowed system which provides a valid code window, a second relatively insecure code window in which two successive valid codes must be received and finally a window in which no valid codes are recognized due to the likelihood of the receiver having been stolen.

It is a principal object of the present invention to provide a security system involving a radio frequency transmitter and receiver wherein multiple security conditions may exist requiring different levels of signal security.

It is another object of the present invention to provide a secure radio transmitter receiver system which may rapidly and easily decode a relatively large code combination.

Other advantages of the invention will become obvious to one of ordinary skill in the art upon a perusal of the following specification and claims in light of the accompanying drawings.

BRIEF DESCRIPTION OF THE DRAWINGS

FIGS. 5A and 5B are schematic diagrams of the receiver shown in FIG. 3;

DETAILED DESCRIPTION OF THE PREFERRED EMBODIMENT

Figure 1:
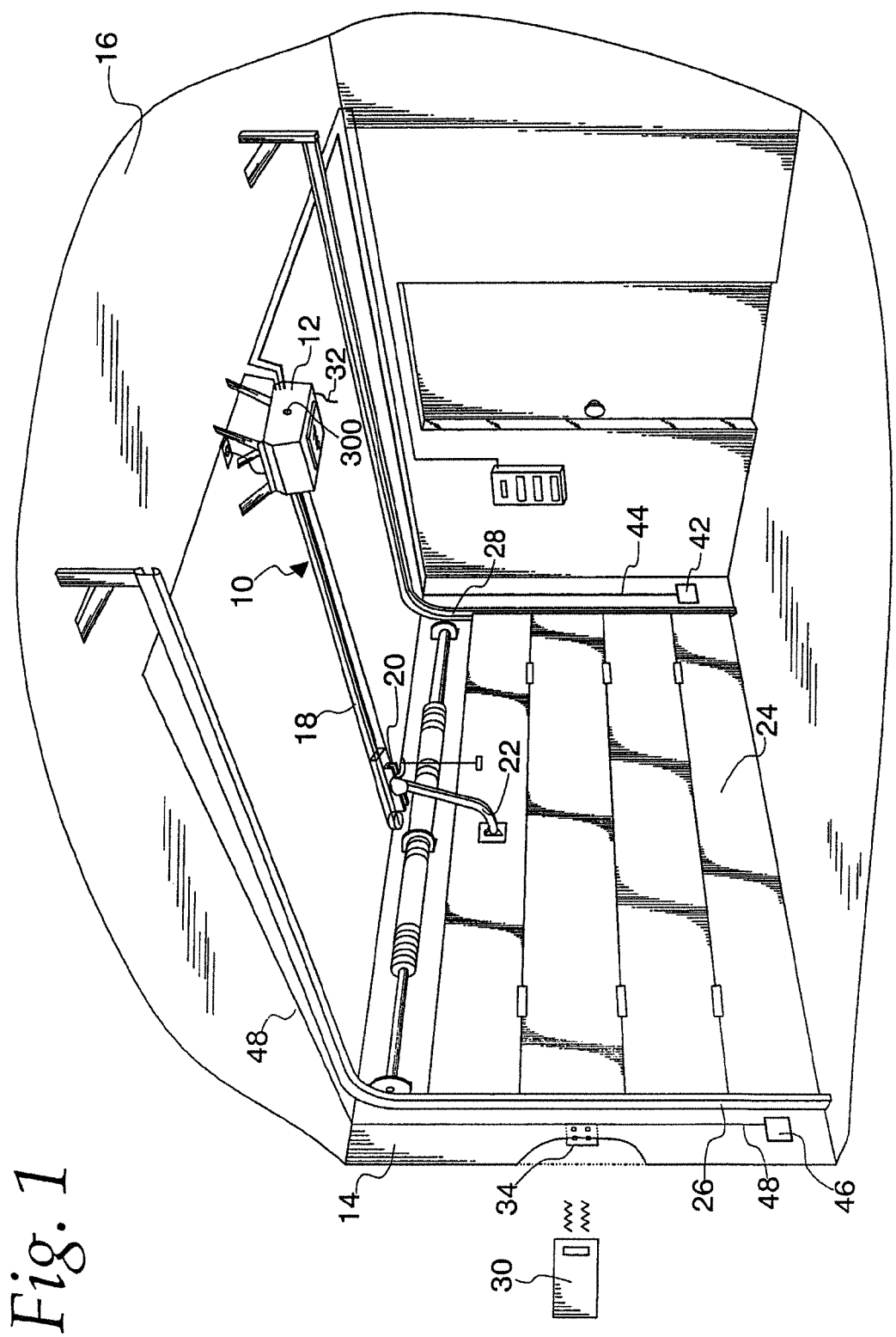
FIG. 1 is a perspective view of an apparatus for moving a barrier or garage embodying the present invention.

Referring now to the drawings and especially to FIG. 1, more specifically a movable barrier door operator or garage door operator is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and communicate via radio frequency transmission with the antenna 32 of the head unit 12.

An optical emitter 42 is connected via a power and signal line 44 to the head unit. An optical detector 46 is connected via a wire 48 to the head unit 12.

Figure 2:
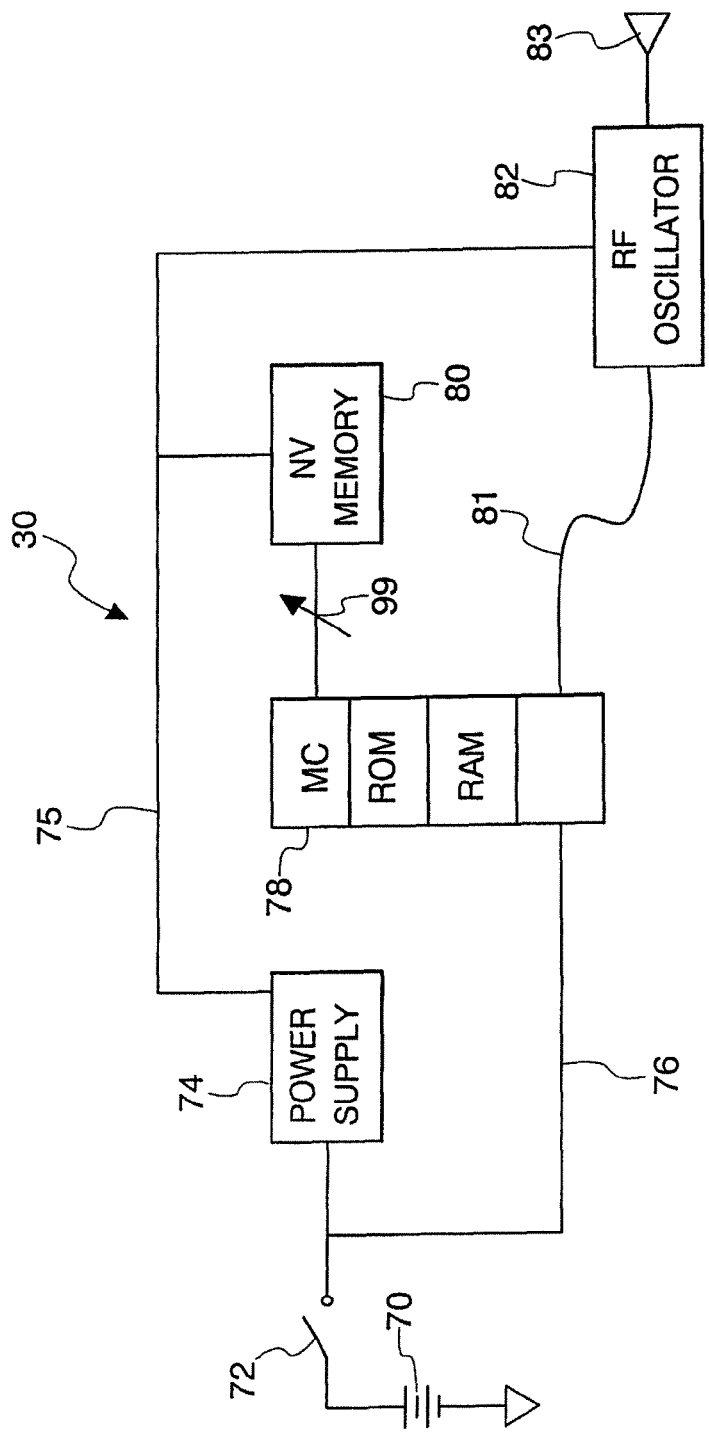
FIG. 2 is a block diagram of a transmitter for use with a garage door operator of FIG. 1.
Figure 4:
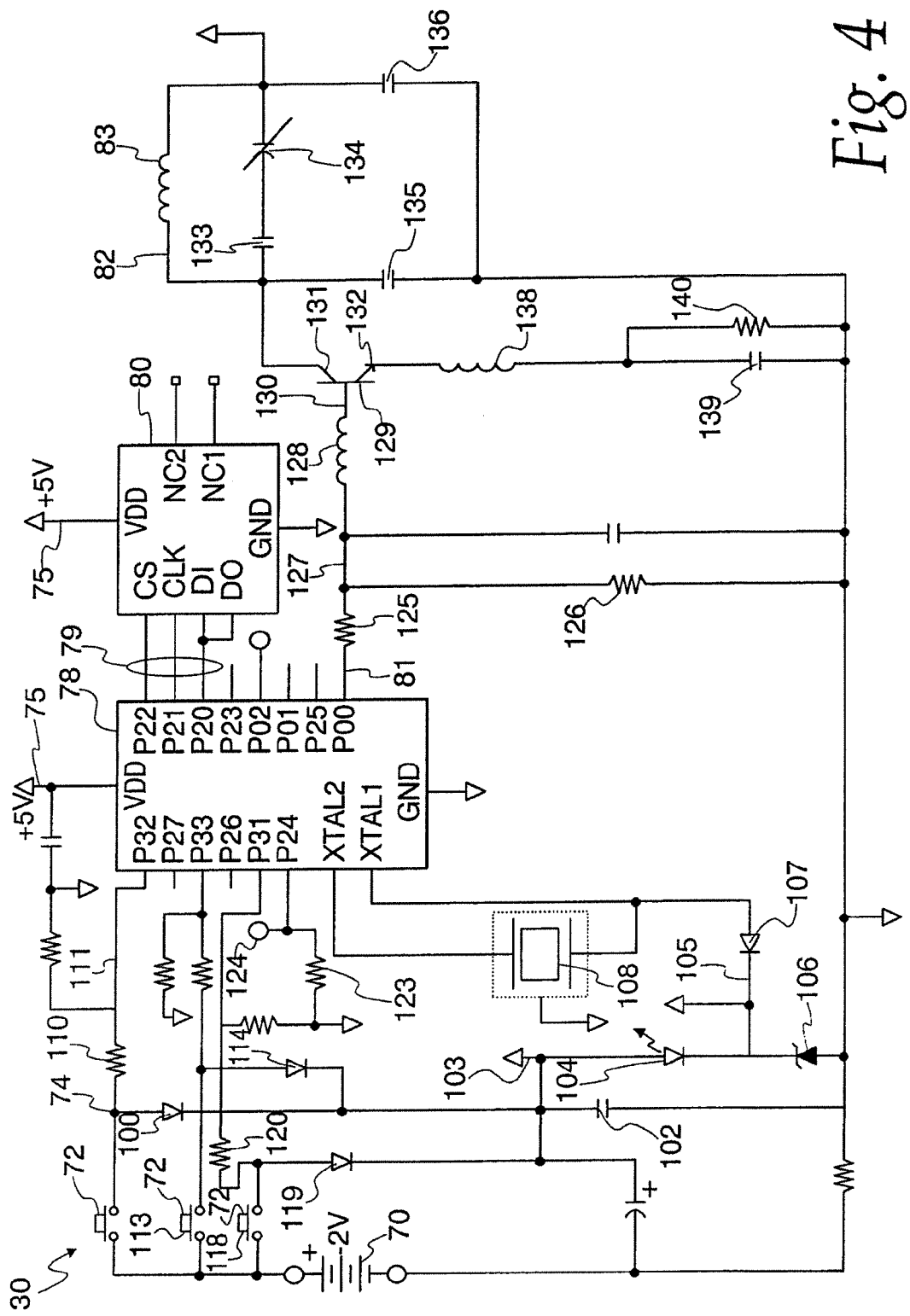
FIG. 4 is a schematic diagram of the transmitter shown in FIG. 2.

Referring now to FIG. 2, the transmitter 30 is shown therein in general and includes a battery 70 connected by a pushbutton switch 72 to a power supply 74 which is coupled via leads 75 and 76 to a microcontroller 78. The microcontroller 78 is connected by a serial bus 79 to a non-volatile memory 80. An output bus 81 connects the microcontroller to a radio frequency oscillator 82. The microcontroller 78 produces coded signals when the button 72 is pushed causing the output of the RF oscillator 82 to be amplitude modulated to supply a radio frequency signal at an antenna 83 connected thereto. More specifically, as shown in FIG. 4, details of the transmitter 30 are shown therein, including a plurality of switches 72. When switch 72 is closed, power is supplied through a diode 100 to a capacitor 102 to supply a 7.1 volt voltage at a lead 103 connected thereto. A light emitting diode 104 indicates that the transmitter button has been pushed and provides a voltage to a lead 105 connected thereto. A Zener diode 106 provides voltage regulation and causes the back biased diode 107 to cause the crystal 108 to be energized, thereby energizing the microcontroller 78, a Zilog 125C0113 8-bit microcontroller in this embodiment. The signal is also sent via a resistor 110 through a lead 111 to a P32 pin of the microcontroller 78. Likewise, when a switch 113 is closed, current is fed through a diode 114 to the lead 103 also causing the crystal 108 to be energized, powering up the microcontroller at the same time that P33 of the microcontroller is pulled up. Similarly, when a switch 118 is closed, power is fed through a diode 119 to the crystal 108 as well as pull up voltage being provided through a resistor 120 to the pin P31. It should also be appreciated that pin P34 of the microcontroller is configured via a connection with the resistor 123 to be an RS232 input port 124.

The microcontroller is coupled via the serial bus 79 to a chip select port, a clock port and a DI port to which and from which serial data may be written and read and to which addresses may be applied. As will be seen hereinafter in the operation of the microcontroller, the microcontroller 78 produces output signals at the lead 81, which are supplied to a resistor 125 which is coupled to a voltage dividing resistor 126 feeding signals to the lead 127. A 30-nanohenry inductor 128 is coupled to an NPN transistor 129 at its base 130. The transistor 129 has a collector 131 and an emitter 132. The collector 131 is connected to the antenna 83 which, in this case, comprises a printed circuit board, loop antenna having an inductance of 25-nanohenries, comprising a portion of the tank circuit with a capacitor 133, a variable capacitor 134 for tuning, a capacitor 135 and a capacitor 136. An 30-nanohenry inductor 138 is coupled via a capacitor 139 to ground. The capacitor has a resistor 140 connected in parallel with it to ground. When the output from lead 81 is driven high by the microcontroller, the capacitor Q1 is switched on causing the tank circuit to output a signal on the antenna 83. When the capacitor is switched off, the output to the drive the tank circuit is extinguished causing the radio frequency signal at the antenna 83 also to be extinguished.

Figure 3:
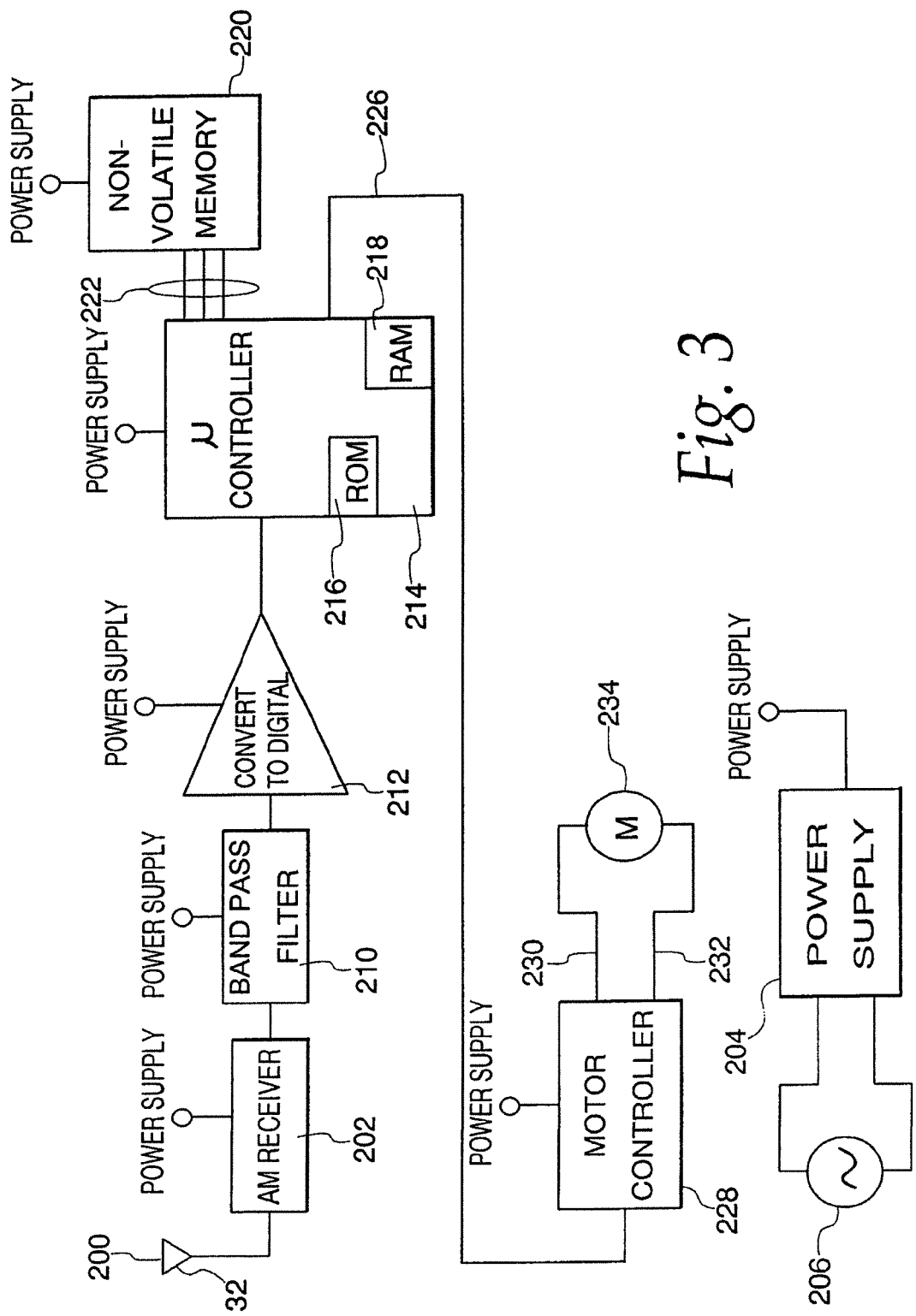
FIG. 3 is a block diagram of a receiver positioned within a head unit of the garage door operator shown in FIG. 1.

Referring now to FIG. 3, the receiver is shown therein and includes a receiver antenna 200 coupled to an amplitude modulated receiver 202 driven from a power supply 204 connectable to a source of alternating current 206. The receiver 202 provides a demodulated output via a bandpass filter 210 to an analog-to-digital converter 212 which provides input to a microcontroller 214 having an internal read-only memory 216 and an internal random-access memory 218. A serial non-volatile memory 220 is connected via a memory bus 222 to the microcontroller 214 to send and receive information thereto. The microcontroller has an output line 226 coupled to a motor controller 228 which may include a plurality of relays or other standard electromechanical features which feeds electrical current on lines 230 and 232 to an electric motor 234.

Figure 5B:
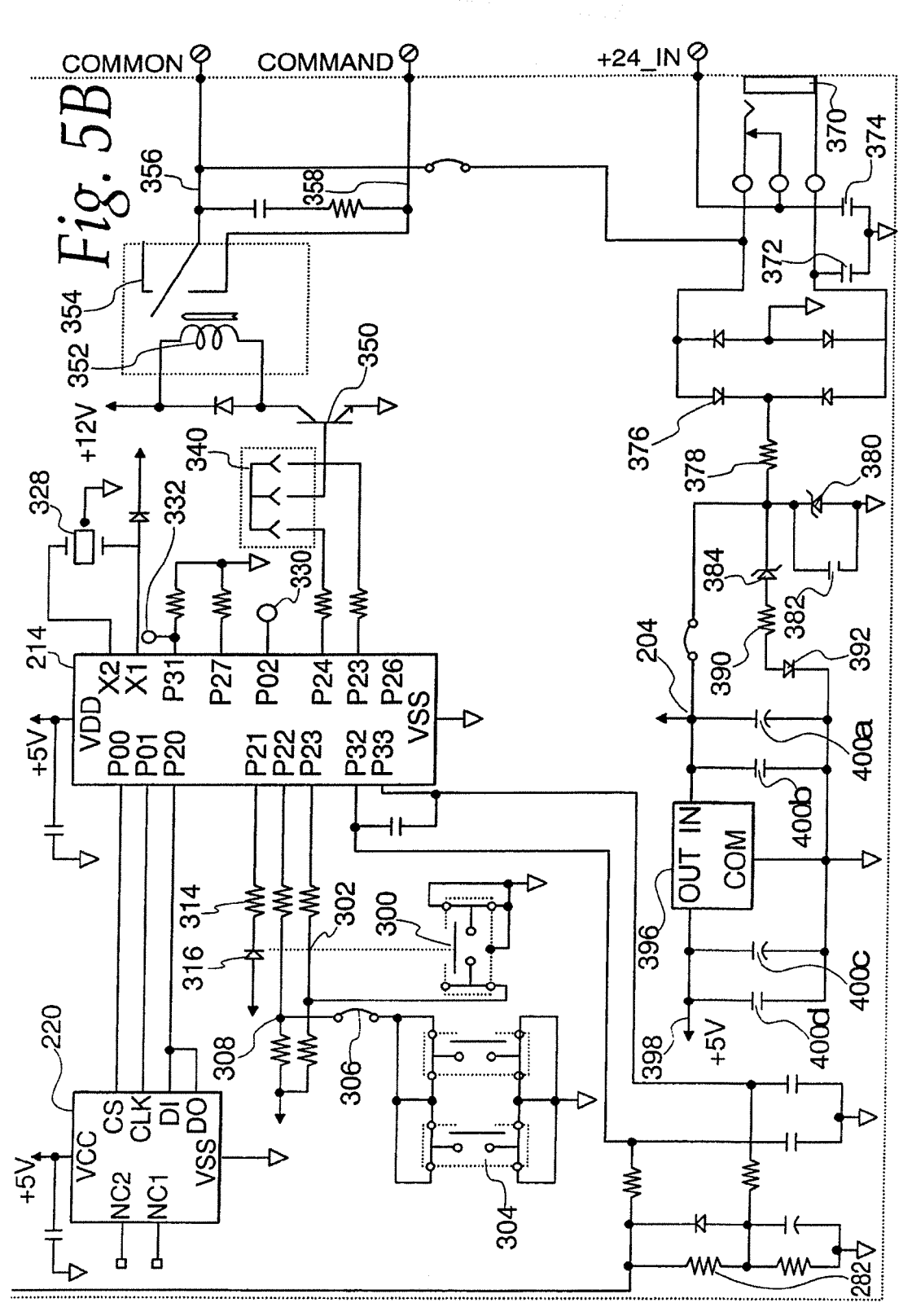

Referring now to FIGS. 5A and 5B, the antenna 200 coupled to a reactive divider network 250 comprised of a pair of series connected inductances 252 and 254 and capacitors 256 and 258 which supply an RF signal to a buffer amplifier having an NPN transistor 260, at its emitter 261. The NPN transistor 260 has a pair of capacitors 262 and 264 connected to it for power supply isolation. The buffer amplifier provides a buffered radio frequency output signal on a lead 268. The buffered RF signal is fed to an input 270 which forms part of a super-regenerative receiver 272 having an output at a line 274 coupled to the bandpass filter which provides digital output to the bandpass filter 212. The bandpass filter 212 includes a first stage 276 and a second stage 278 to provide a digital level output signal at a lead 280 which is supplied via an averaging circuit 282 to an input pin P32 of the microcontroller 214.

The microcontroller 214 may have its mode of operation controlled by a programming or learning switch 300 coupled via a line 302 to the P25 pin. A command switch 304 is coupled via a jumper 306 to a line 308 and ultimately through a resistor to the input pin P22. A pin P21 sinks current through a resistor 314 connected to a light emitting diode 316, causing the diode to light to indicate that the receiver is active. The microcontroller 214 has a 4 MHz crystal 328 connected to it to provide clock signals and includes an RS232 output port 332 that is coupled to the pin P31. A switch 340 selects whether constant pressure or monostable is to be selected as the output from output terminals P24 and P23 which are coupled to a transistor 350 which, when switched on, sinks current through a coil 352 of a relay 354, causing the relay to close to provide an actuating signal on a pair of leads 356 and 358 to an electric motor.

It may be appreciated that the power supply 204 may receive power from an external transformer or other AC source through a jack 370 which is connected to a pair of RJ uncoupling capacitors 372 and 374. The input signal is then set to a full-wave rectifier bridge 376 which provides an output current at a resistor 378. An 18-volt Zener diode 380 is connected between ground and the resistor 378 and includes high frequency bypass capacitor 382 connected in parallel with it. An 8.2-volt Zener diode 384 is connected in back-biased configuration to the resistor 378 to receive a signal therefrom to guarantee that at least an 8.2-volt signal is fed to a resistor 390 causing an LED 293 to be illuminated and also causing power to be supplied to a 5-volt 78L05 voltage regulator 396. The voltage regulator 396 supplies regulated voltage to an output line 398. Filtering capacitors 400*a*, 400*b*, 400*c* and 400*d* limit the fluctuations at the power supply.

Figure 6:
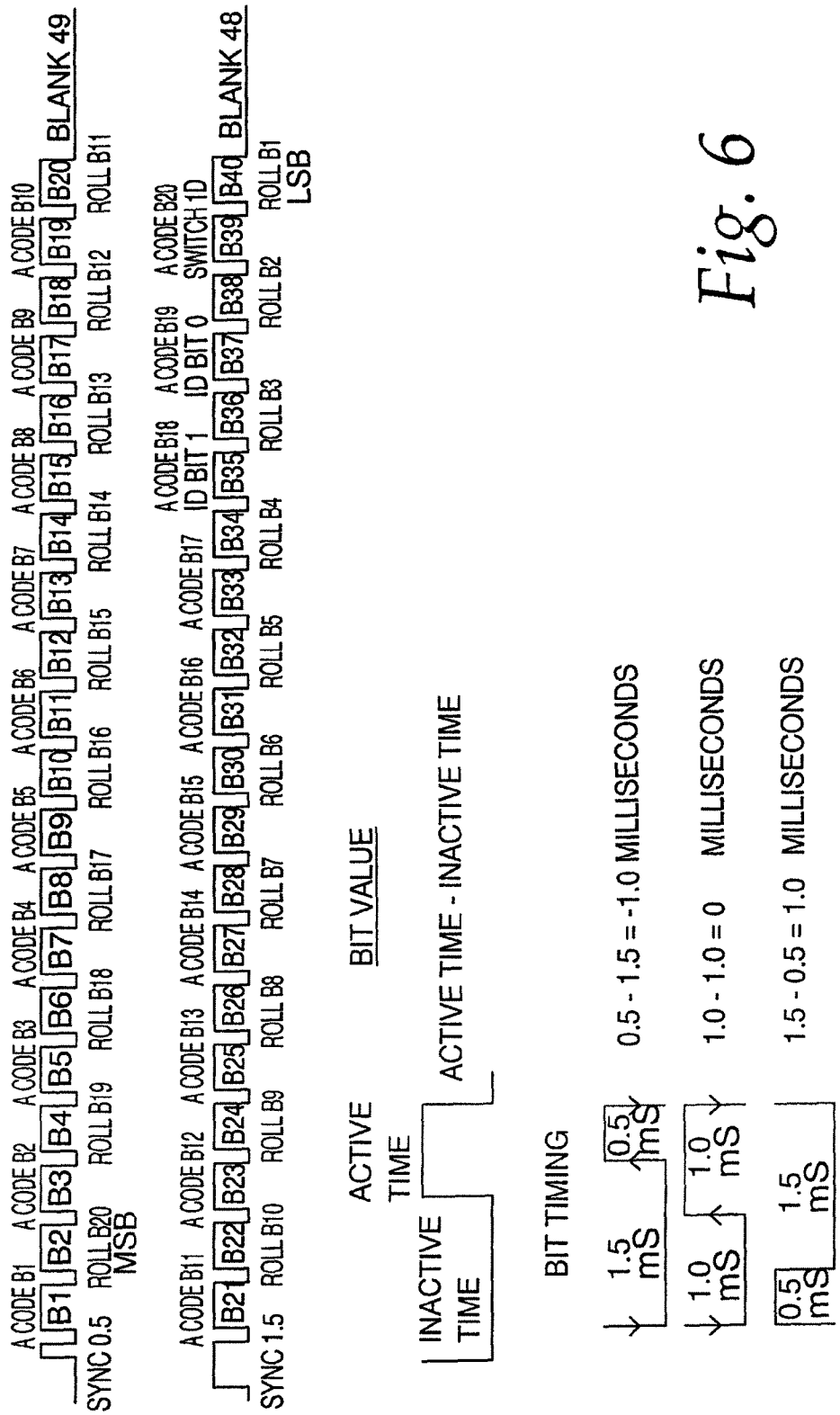
FIG. 6 is a timing diagram of signals generated by a portion of the transmitter.
Figure 7B:
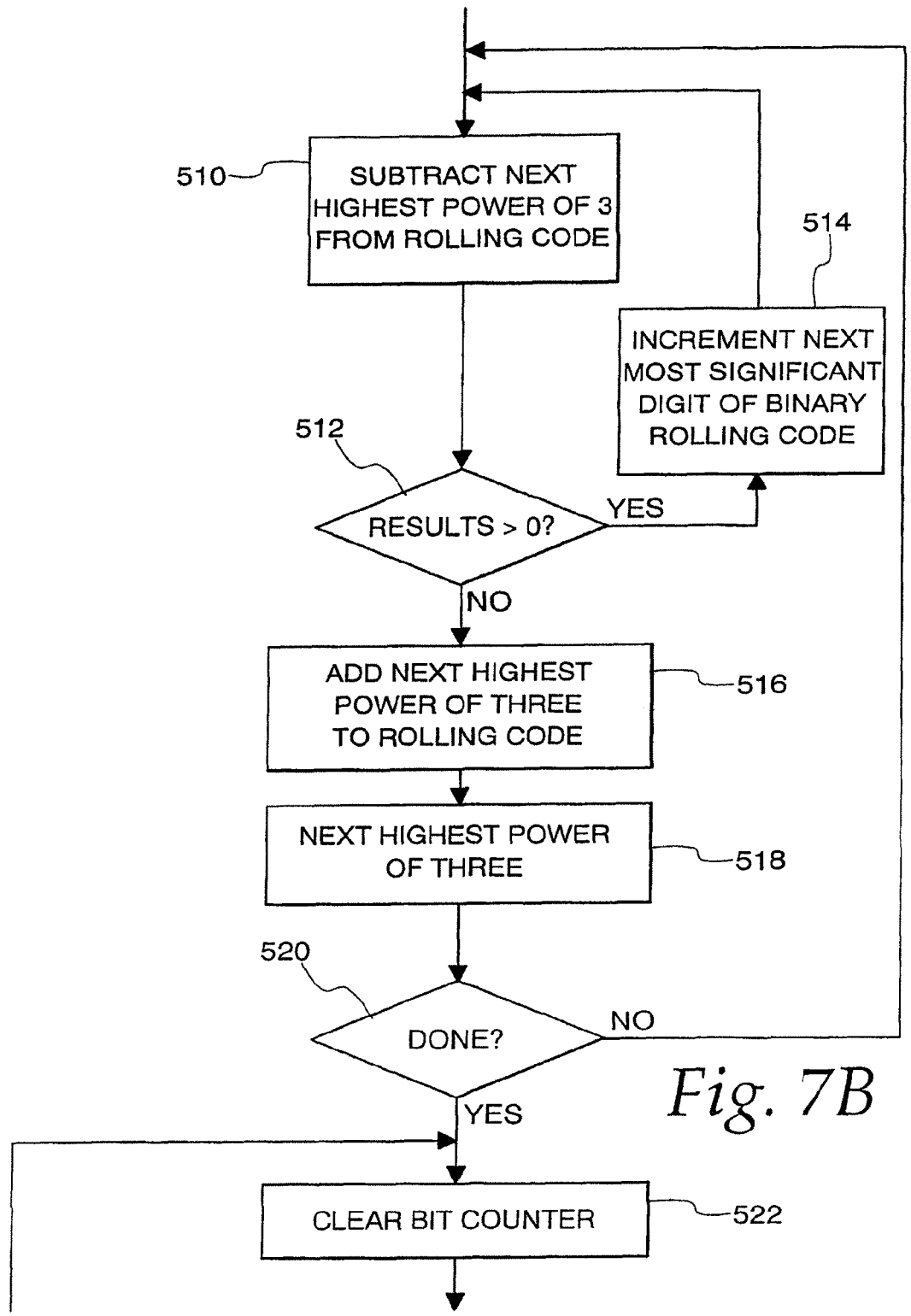
FIGS. 7A, B and C are flow diagrams showing the operation of the transmitter.
Figure 7C:
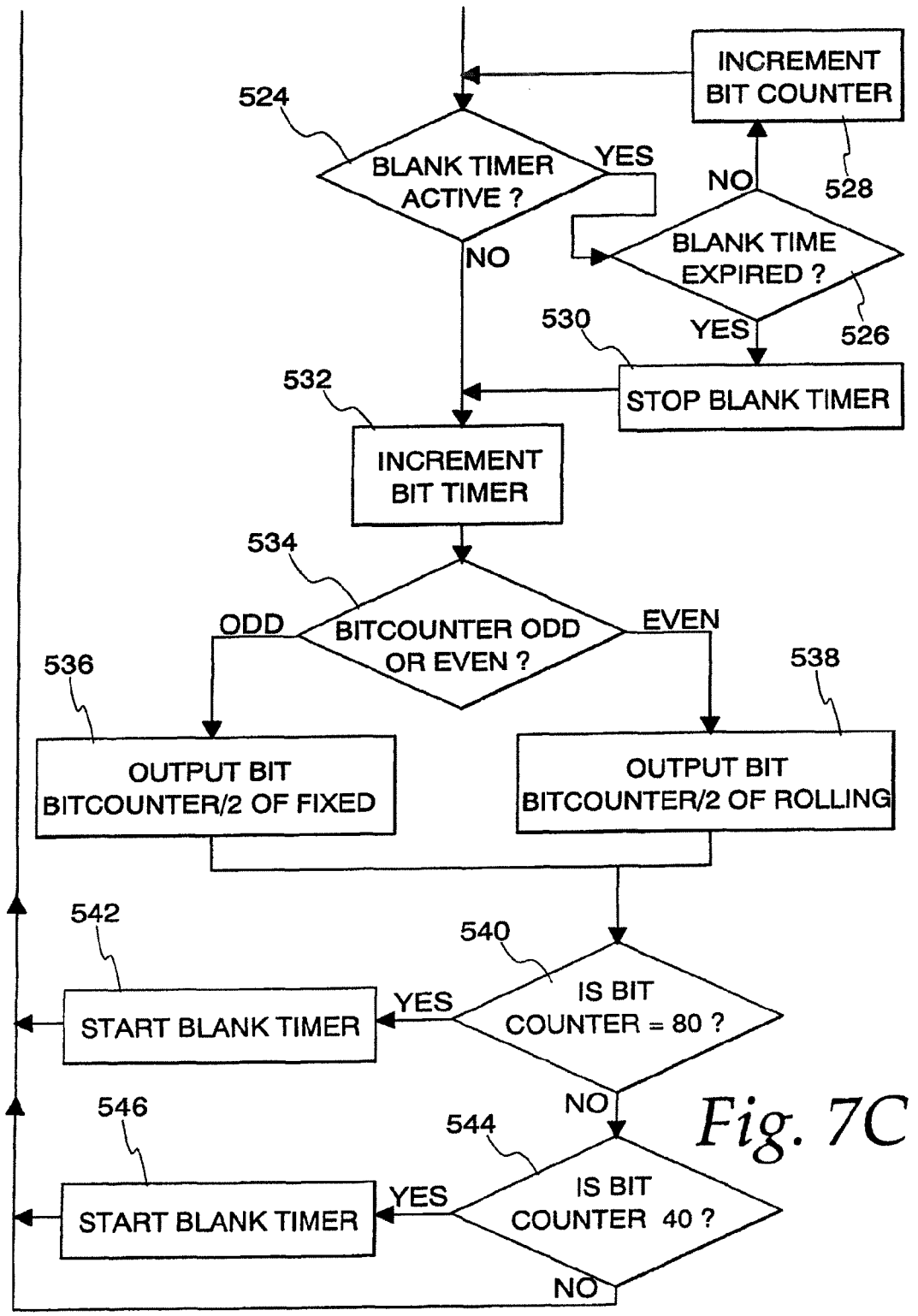

The program code listing for the transmitter is set forth at pages A-1 through A-19 and for the receiver at pages A-20 through A-51 of the attached appendix. Referring now to FIGS. 7A through 7C, the flow chart set forth therein describes the operation of the transmitter. A rolling code is incremented by three in a step 500, followed by the rolling code being stored for the next transmission from the transmitter when the transmitter button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code is set to 0. It may be appreciated that it is trinary code which is actually used to modify the radio frequency oscillator signal and the trinary code is best seen in FIG. 6. It may be noted that the bit timing in FIG. 6 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is greater than zero. If it is, the next most significant digit of the binary rolling code is incremented in a step 514, following which flow is returned to the step 510. If the result is not greater than 0, the next highest power of 3 is added to the rolling code in the step 516. In the step 518, another highest power of 3 is incremented and in a step 518, another highest power of 3 is incremented and in a step 520, a test is determined as to whether the rolling code is completed. If it is not, control is transferred back to step 510. If it has, control is transferred to step 522 to clear the bit counter. In a step 524, the blank time is tested to determine whether it is active or not. If it is not, a test is made in a step 526 to determine whether the blank time has expired. If the blank time has not expired, control is transferred to a step 528 in which the bit counter is incremented, following which control is transferred back to the decision step 524. If the blank time has expired as measured in decision step 526, the blank time is stopped in a step 530 and the bit counter is incremented in a step 532. The bit counter is then tested for odd or even in a step 534. If the bit counter is not even, control is transferred to a step 536 where the output bit of the bit counter divided by 2 is fixed. If the bit counter is even, the output bit counter divided by 2 is rolling in a step 538. The bit counter is tested to determine whether it is set to equal to 80 in a step 540. If it is, the blank timer is started in a step 542. If it is not, the bit counter is tested for whether it is equal to 40 in a step 546. If it is, the blank timer is tested and is started in a step 544. If the bit counter is not equal to 40, control is transferred back to step 522.

Figure 8A:
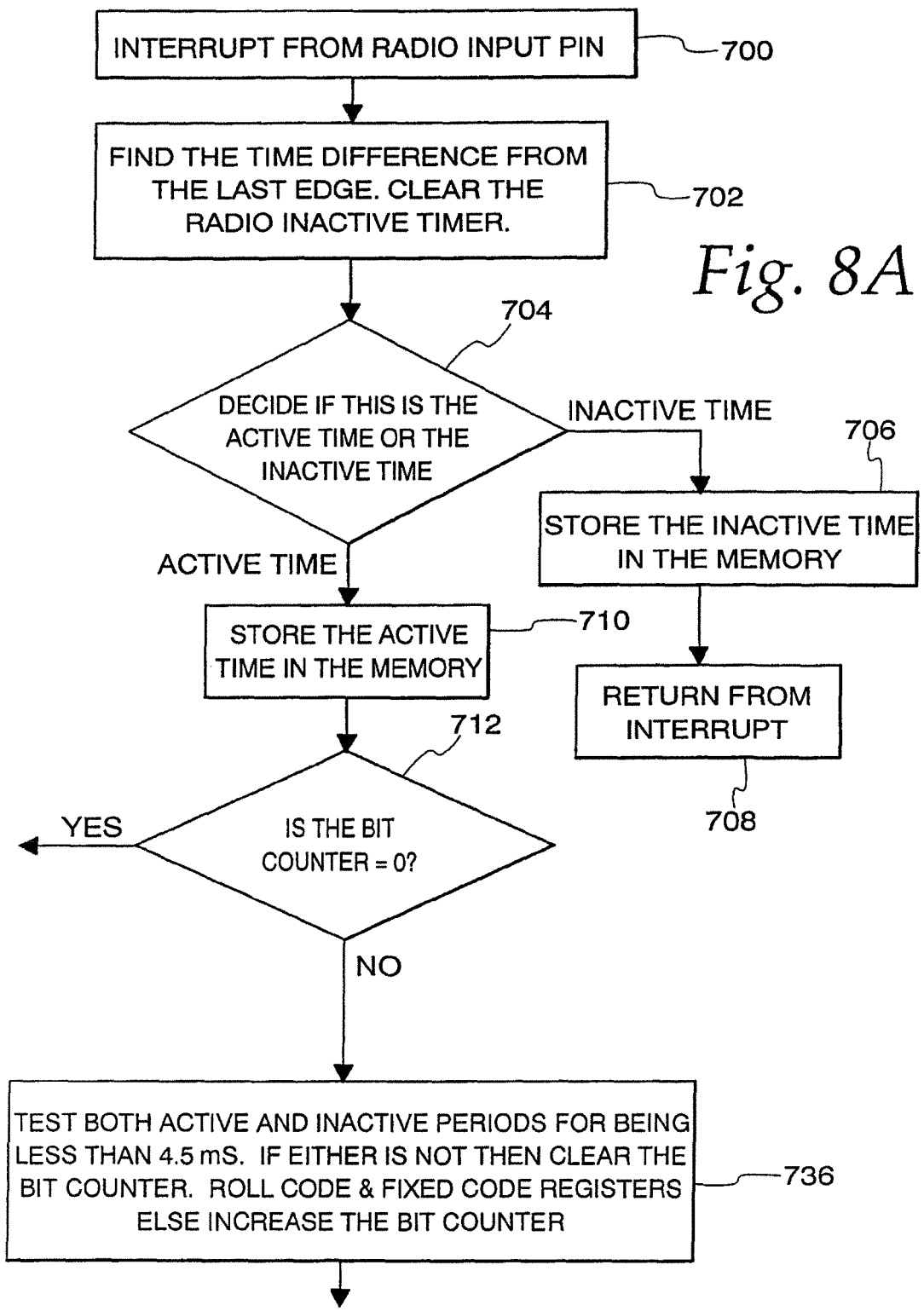
FIGS. 8A, B, C, D, E and F are flow charts showing the operation of the receiver.

Referring now to FIGS. 8A through 8F and, in particular, to FIG. 8A, the operation of the receiver is set forth therein. In a step 700, an interrupt is detected and acted upon from the radio input pin. The time difference between the last edge is determined and the radio inactive timer is cleared in step 702. A determination is made as to whether this is an active time or inactive time in a step 704, i.e., whether the signal is being sent with carrier or not. If it is an inactive time, indicating the absence of carrier, control is transferred to a step 706 to store the inactive time in the memory and the routine is exited in a step 708. In the event that it is an active time, the active time is stored in memory in a step 710 and the bit counter is tested in a step 712. If the bit counter zero, control is transferred to a step 714, as may best be seen in FIG. 8B and a test is made to determine whether the inactive time is between 20 milliseconds and 55 milliseconds. If it is not, the bit counter is cleared as well as the rolling code register and the fixed code register in step 716 and the routine is exited in step 718.

Figure 8C:
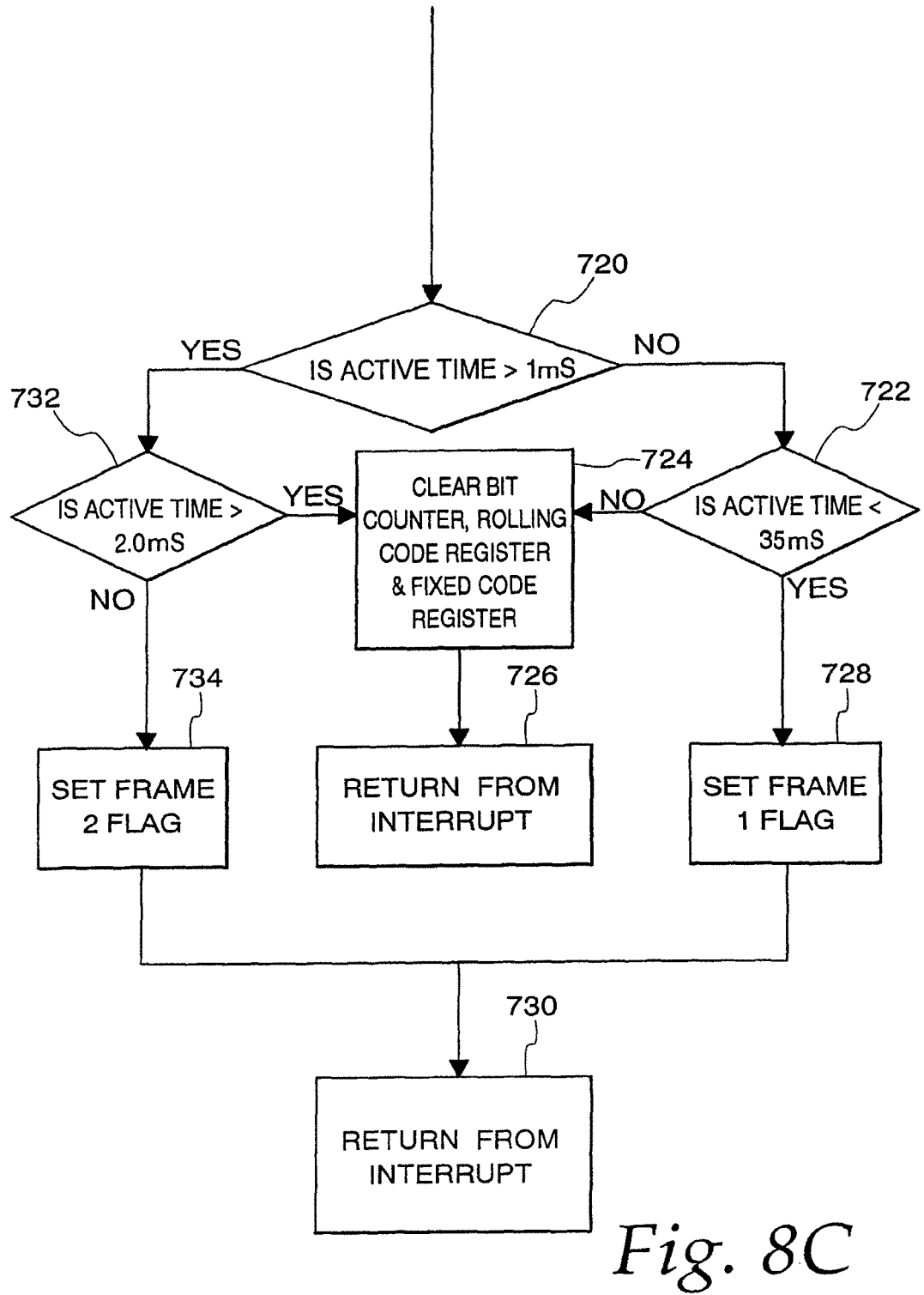

In the event that the inactive time is between 20 milliseconds and 55 milliseconds, a test is made in a step 720 to determine whether the active time is greater than 1 millisecond, as shown in FIG. 8C. If it is not, a test is made in a step 722 to determine whether the inactive time is less than 0.35 millisecond. If it is, a frame 1 flag is set in a step 728 identifying the incoming information as being associated with frame 1 and the interrupt routine is exited in a step 730. In the event that the active time test in step 722 is not less than 0.35 millisecond, in the step 724, the bit counter is cleared as well as the rolling code register and the fixed register and the return is exited in the step 726. If the active time is greater than 1 millisecond as tested in step 720, a test is made in a step 732 to determine whether the active time is greater than 2.0 milliseconds. If it is not, the frame 2 flag is set in a step 734 and the routine is exited in step 730. If the active time is greater than 2 milliseconds, the bit counter rolling code register and fixed code register are cleared in step 724 and the routine is exited in step 726.

Figure 8D:
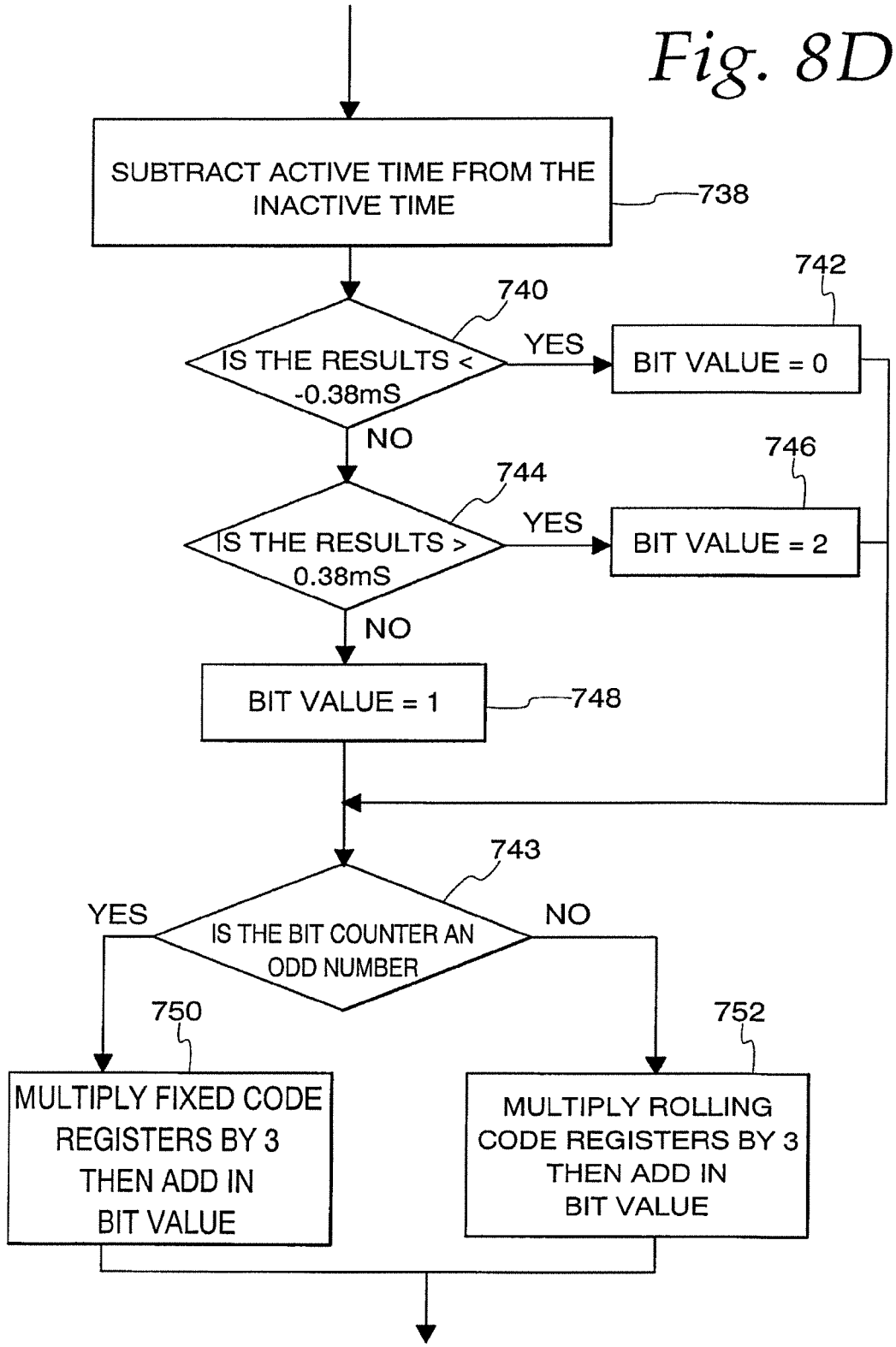

In the event that the bit counter test in step 712 indicates that the bit counter is not 0, control is transferred to setup 736, as shown in FIG. 8A. Both the active and inactive periods are tested to determine whether they are less than 4.5 milliseconds. If either is not less than 4.5 milliseconds, the bit counter is cleared as well as the rolling code register and the fixed code registers. If both are equal to greater than 4.5 milliseconds, the bit counter is incremented and the active time is subtracted from the inactive time in the step 738, as shown in FIG. 8D. In the step 740, the results of the subtraction are determined as to whether they are less than 0.38 milliseconds. If they are the bit value is set equal to zero in step 742 and control is transferred to a decision step 743. If the results are not less than 0.38 milliseconds, a test is made in a step 744 to determine if the difference between the active time and inactive time is greater than 0.38 milliseconds and control is then transferred to a step 746 setting the bit value equal to 2. Both of the bit values being set in steps 742 and 746 relate to a translation from the three-level trinary bits 0, 1 and 2 to a binary number.

If the result of the step 744 is in the negative, the bit value is set equal to 1 in step 748. Control is then transferred to the step 743 to test whether the bit counter is set to an odd or an even number. If it is set to an odd number, control is transferred to a step 750 where the fixed code, indicative of the fact that the bit is an odd numbered bit in the frame sequence, rather an even number bit, which would imply that it is one of the interleaved rolling code bits, is multiplied by three and then the bit value added in.

Figure 8E:
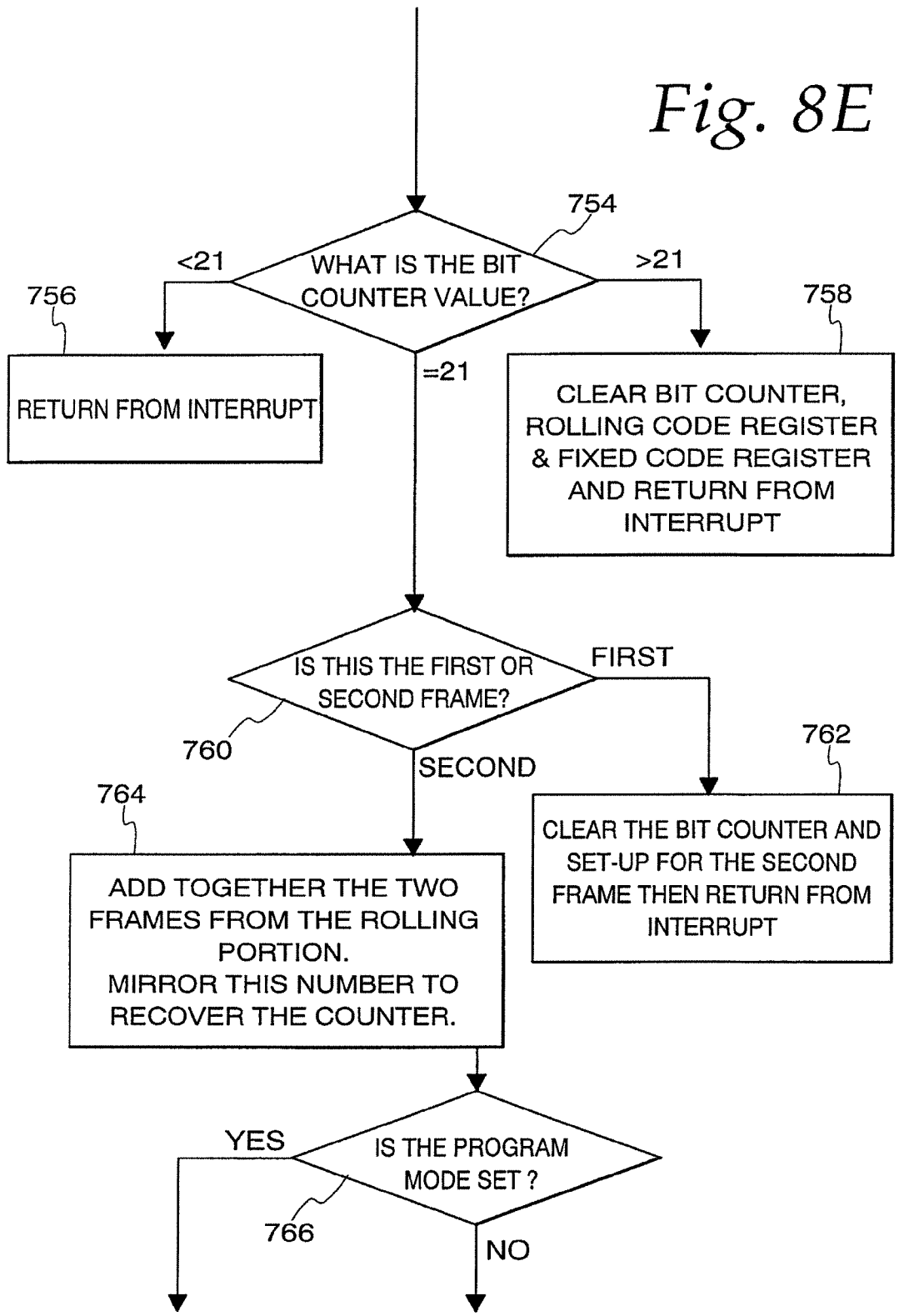
Figure 8F:
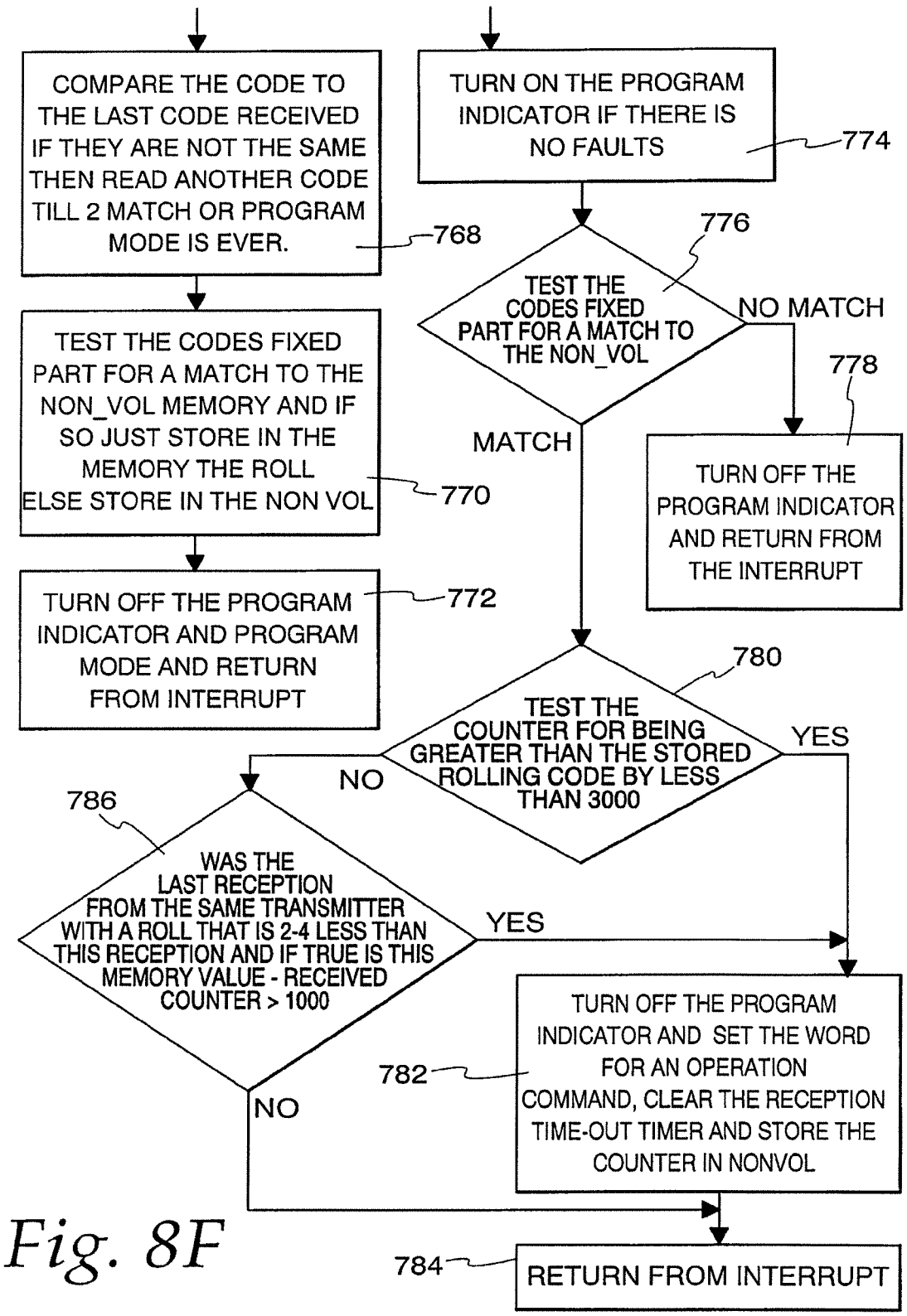

If the bit counter indicates that it is an odd number trinary bit being processed, the existing rolling code registers are multiplied by three and then the trinary bit value obtained from steps 742, 746 and 748 is added in. Whether step 750 or 752 occurs, the bit counter value is then tested in the step 754, as shown in FIG. 8E. If the bit counter value is greater than 21, the bit counter rolling code register and fixed code register are cleared in the step 758 and the routine is exited. If the bit counter value is less than 21, there is a return from the interrupt sequence in a step 756. If the bit counter value is equal to 21, indicating that a sink bit plus trinary data bits have been received, a test is made in a step 760 to determine whether the sink bit was indicative of a first or second frame, if it was indicative of a first frame, the bit counter is cleared and set up is done for the second frame following which there is a return from the routine in the step 762. In the event that the second frame is indicated as being received by the decision of step 760, the two frames have their rolling contributions added together to form the complete inverted rolling code. The rolling code is then inverted or mirrored to recover the rolling code counter value in the step 764. A test is made in the step 766 to determine whether the program mode has been set. If it has been set, control is transferred to a step 768 where the code is compared to the last code received. If there is no match, as would be needed in order to get programming, then another code will be read until two successive codes match or the program mode is terminated. In a step 770, the codes are tested such that the fixed codes are tested for a match with a fixed code non-volatile memory. If there is a match, the rolling portion is stored in the memory. If there is not, it is stored in the non-volatile memory. Control is then transferred to step 772, the program indicator is switched off, the program mode is exited and there is a return from the interrupt. In the event that the test of step 766 indicates that the program mode has not been set, the program indicator is switched on in a step 774, as shown in FIG. 8F. The codes are tested to determine whether there is a match for the fixed portion of the code in the step 776. If there is not match, the program indicator is switched off and the routine is exited in step 778. If there is a match, the counter which is indicative of the rolling code is tested to determine whether its value is greater than the stored rolling code by a factor or difference of less than 3,000 indicating an interval of 1,000 button pushes for the transmitter. If it is not, a test is made in the step 786 to determine whether the last transmission from the same transmitter is with a rolling code that is two to four less than the reception and, if true, is the memory value minus the received rolling code counter value greater than 1,000. If it is, control is transferred to a step 782 switching off the program indicator and setting the operation command word causing a commanded signal to operate the garage door operator. The reception time out timer is cleared and the counter value for the rolling code is stored in non-volatile memory, following which the routine is exited in the step 784. In the event that the difference is not greater than 1,000, in step 786 there is an immediate return from the interrupt in the step 784. In the event that the counter test in the step 780 is positive, steps 782 and 784 are then executed thereafter.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A transmitter for sending an encrypted signal to control a device, comprising:
   means for generating a radio frequency oscillatory signal;
   means for generating a variable binary code;
   means for generating a three-valued or trinary code responsive to the variable binary code; and
   means for modulating the radio frequency oscillatory signal with the trinary code to produce a modulated trinary coded variable radio frequency signal for operation or control of a secure actuator.

2. A wireless transmitter for sending a security code to a movable barrier operator, the movable barrier operator configured to interpret the security code from the wireless transmitter to be in one of an invalid window, a valid window, or an insecure window, the wireless transmitter comprising:
   a user interface;
   a radio frequency transmitter;
   a control circuit operably coupled to the user interface and to the radio frequency transmitter, the control circuit being configured to respond to a sequence of user assertions of the interface by causing the radio frequency transmitter to transmit a corresponding sequence of security codes including a first security code to be interpreted by the movable barrier operator as being in the insecure code window and a different, second security code having a predetermined relationship to the first security code.

3. The wireless transmitter of claim 2 wherein the second security code represents a security code transmitted after the first security code in the sequence of security codes.

4. The wireless transmitter of claim 2 wherein the security codes have variable portions that differ from the security codes of the preceding security codes in the sequence.

5. The wireless transmitter of claim 4 wherein the variable portions of the security codes comprise rolling codes.

6. The wireless transmitter of claim 2 wherein the security codes have fixed portions that are the same throughout the sequence.

7. The wireless transmitter of claim 2 including a carrier frequency generator and a modulator to transmit the security codes by modulating the carrier frequency.

8. A method of using wireless transmitter to operate a movable barrier operator, the movable barrier operator configured to interpret a security code from a wireless transmitter to be in one of an invalid window, a valid window, or an insecure window, the method comprising:
   at the wireless transmitter:
      receiving a sequence of assertions of a user interface; and
      transmitting a corresponding sequence of security codes including a first code to be interpreted by the movable barrier operator as being in the insecure code window and a different, second security code having a predetermined relationship to the first security code.

9. The method of claim 8 wherein transmitting the sequence of security codes includes transmitting the second security code after the first security code in the sequence of security codes.

10. The method of claim 8 wherein transmitting the sequence of security codes includes transmitting security codes having variable portions that differ from the preceding security codes in the sequence.

11. The method of claim 10 wherein transmitting security codes having variable portions includes transmitting security codes that comprise rolling codes.

12. The method of claim 8 wherein transmitting the sequence of security codes includes transmitting security codes having fixed portions that are the same throughout the sequence.

13. The method of claim 8 wherein transmitting the sequence of security codes includes generating a carrier frequency and modulating the carrier frequency.

* * * * *